(12) United States Patent
Saito

(10) Patent No.: US 8,147,929 B2
(45) Date of Patent: Apr. 3, 2012

(54) LIQUID CRYSTAL COMPOSITION AND LIQUID CRYSTAL DISPLAY DEVICE

(75) Inventor: Masayuki Saito, Chiba (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 66 days.

(21) Appl. No.: 12/760,426

(22) Filed: Apr. 14, 2010

(65) Prior Publication Data

US 2010/0302498 A1 Dec. 2, 2010

(30) Foreign Application Priority Data

May 27, 2009 (JP) ................................. 2009-127880

(51) Int. Cl.
*C09K 19/30* (2006.01)
*C09K 19/12* (2006.01)
*C09K 19/34* (2006.01)
*C09K 19/20* (2006.01)

(52) U.S. Cl. ............... 428/1.1; 252/299.61; 252/299.63; 252/299.66; 252/299.67

(58) Field of Classification Search ............ 252/299.63, 252/299.61, 299.66, 299.67; 428/1.1
See application file for complete search history.

(56) References Cited

U.S. PATENT DOCUMENTS

| | | | |
|---|---|---|---|
| 3,660,505 A | 5/1972 | Starnes, Jr. ................. 260/619 |
| 5,032,313 A | 7/1991 | Goto et al. ............... 252/299.63 |
| 6,126,857 A | 10/2000 | Reiffenrath et al. ...... 252/299.63 |
| 6,174,457 B1 * | 1/2001 | Kato et al. ............... 252/299.63 |
| 7,001,646 B2 | 2/2006 | Heckmeier et al. ............ 428/1.1 |
| 7,390,538 B2 | 6/2008 | Manabe et al. ............... 428/1.1 |
| 7,470,456 B2 | 12/2008 | Yanai et al. |
| 2003/0134056 A1 | 7/2003 | Heckmeier et al. ............ 428/1.1 |
| 2006/0043334 A1 | 3/2006 | Tomi |
| 2007/0001149 A1 | 1/2007 | Manabe et al. .......... 252/299.66 |
| 2007/0278450 A1 | 12/2007 | Yanai et al. |
| 2008/0029736 A1 | 2/2008 | Saito |
| 2008/0029737 A1 | 2/2008 | Saito |

FOREIGN PATENT DOCUMENTS

| | | |
|---|---|---|
| DE | 10 2004 030 315 A1 | 1/2005 |
| DE | 102008046379 A1 | 4/2009 |
| EP | 1862526 A1 | 12/2007 |
| EP | 2182042 A1 | 5/2010 |
| EP | 2182044 A1 | 5/2010 |
| EP | 2182045 A1 | 5/2010 |
| JP | 57-165328 | 10/1982 |
| JP | 02-233626 | 9/1990 |
| JP | 9-077692 | 3/1997 |
| JP | 10-046150 | 2/1998 |
| JP | 10-114690 | 5/1998 |
| JP | 10-251186 | 9/1998 |
| WO | WO 01/46336 A2 | 6/2001 |
| WO | 2009028367 A1 | 3/2009 |
| WO | 2009028368 A1 | 3/2009 |
| WO | 2009028443 A1 | 3/2009 |
| WO | 2009046803 A1 | 4/2009 |

OTHER PUBLICATIONS

European search report for corresponding European application 10004292.8 lists the references above, 2010.

* cited by examiner

*Primary Examiner* — Shean Wu

(74) *Attorney, Agent, or Firm* — Hogan Lovells US LLP

(57) ABSTRACT

The invention is to provide a liquid crystal composition that satisfies at least one characteristic among characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat, or that is suitably balanced regarding at least two of the characteristics. The invention is to provide an AM device that has a short response time, a large voltage holding ratio, a large contrast ratio, a long service life and so forth.

18 Claims, No Drawings

LIQUID CRYSTAL COMPOSITION AND LIQUID CRYSTAL DISPLAY DEVICE

BACKGROUND OF THE INVENTION

1. Field of the Invention

The invention relates mainly to a liquid crystal composition suitable for use in an active matrix (AM) device, and an AM device containing the composition. More specifically, the invention relates to a liquid crystal composition having a positive dielectric anisotropy, and a device having a mode such as twisted nematic (TN), optically compensated bend (OCB), IPS (in-plane switching) or PSA (polymer sustained alignment), and containing the composition.

2. Related Art

In a liquid crystal display device, a classification based on an operating mode for liquid crystals includes phase change (PC), twisted nematic (TN), super twisted nematic (STN), electrically controlled birefringence (ECB), optically compensated bend (OCB), in-plane switching (IPS), vertical alignment (VA), and polymer sustained alignment (PSA). A classification based on a driving mode in the device includes a passive matrix (PM) and an active matrix (AM). The PM is further classified into static, multiplex and so forth, and the AM is classified into a thin film transistor (TFT), a metal-insulator-metal (MIM) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to give an AM device having good general characteristics. Table 1 below summarizes the relationship between the general characteristics of the two. The general characteristics of the composition will be further explained based on a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable to display moving images on the device. Accordingly, a small viscosity of the composition is desirable. A small viscosity at a low temperature is more desirable.

TABLE 1

General Characteristics of a Liquid Crystal
Composition and an AM Device

| General Characteristics of a Composition | General Characteristics of an AM Device |
|---|---|
| Temperature range of a nematic phase is wide | Usable temperature range is wide |
| Viscosity is small[1] | Response time is short |
| Optical anisotropy is suitable | Contrast ratio is large |
| Dielectric anisotropy is positively or negatively large | Threshold voltage is low and electric power consumption is small |
| | Contrast ratio is large |
| Specific resistance is large | Voltage holding ratio is large and a contrast ratio is large |

TABLE 1-continued

General Characteristics of a Liquid Crystal
Composition and an AM Device

| General Characteristics of a Composition | General Characteristics of an AM Device |
|---|---|
| It is stable to ultraviolet light and heat | Service life is long |

[1] A liquid crystal composition can be injected into a liquid crystal cell in a shorter period of time.

The optical anisotropy of the composition relates to the contrast ratio of the device. The product (Δn×d) of the optical anisotropy (Δn) of the composition and the cell gap (d) of the device is designed so as to maximize the contrast ratio. A suitable value of the product depends on the kinds of operating modes. A suitable value is in the range of about 0.45 μm in such a device having a TN mode. In this case, a composition having a large optical anisotropy is desirable for a device having a small cell gap. A large dielectric anisotropy of the composition contributes to a low threshold voltage, a small electric power consumption and a large contrast ratio of the device. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a temperature close to the maximum temperature of a nematic phase after it has been used for a long time. The stability of the composition to ultraviolet light and heat relates to the service life of the liquid crystal display device. In the case where the stability is high, the device has a long service life. These characteristics are desirable for an AM device used in a liquid crystal projector, a liquid crystal television and so forth.

A composition having a positive dielectric anisotropy is used for an AM device having a TN mode. On the other hand, a composition having a negative dielectric anisotropy is used for an AM device having a VA mode. A composition having a positive or negative dielectric anisotropy is used for an AM device having an IPS mode. A composition having a positive or negative dielectric anisotropy is used for an AM device having a PSA mode. Examples of liquid crystal composition having a positive dielectric anisotropy are disclosed in the following patent documents Nos. 1 to 5.

Conventional compositions are disclosed in the following patent documents. No. 1: JP H9-77692 A (1997); No. 2: JP H10-46150 A (1998); No. 3: JP H10-114690 A (1998); No. 4: JP 2003-518154 A (2003); and No. 5: JP 2007-526931 A (2007).

A desirable AM device has characteristics such as a wide temperature range in which the device can be used, a short response time, a large contrast ratio, a low threshold voltage, a large voltage holding ratio and a long service life. Even one millisecond shorter response time is desirable. Thus, a composition having characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat is especially desirable.

SUMMARY OF THE INVENTION

The invention concerns a liquid crystal composition having a nematic phase that includes at least one compound selected from the group of compounds represented by formula (1) as a first component and at least one compound selected from the group of compounds represented by formula (2) as a second component, and concerns a liquid crystal display device including the composition:

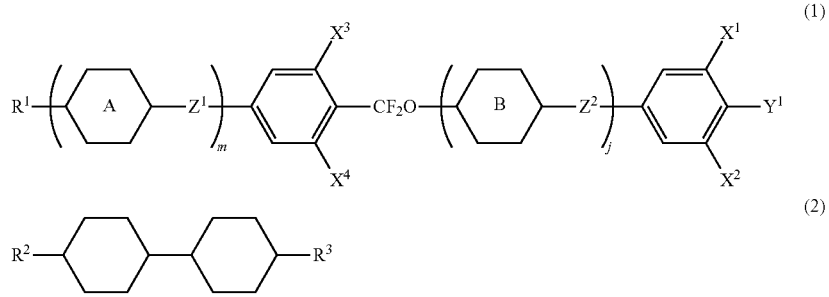

(1)

(2)

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^2$ and $R^3$ are each independently alkenyl having 2 to 12 carbons; ring A and ring B are each independently 1,4-cyclohexylene, 1,4-phenylene, 2-fluoro-1,4-phenylene, 3-fluoro-1,4-phenylene, 3,5-difluoro-1,4-phenylene or pyrimidine-2,5-diyl; $Z^1$ and $Z^2$ are each independently a single bond, ethylene, carbonyloxy or difluoromethyleneoxy; $X^1$, $X^2$, $X^3$ and $X^4$ are each independently hydrogen or fluorine; $Y^1$ is fluorine, chlorine or trifluoromethoxy; and m and j are each independently 0, 1, 2 or 3 and the sum of m and j is 2 or 3.

DETAILED DESCRIPTION OF THE INVENTION

The terms used in the specification and claims are defined as follows. The liquid crystal composition and the liquid crystal display device of the invention may occasionally be abbreviated to "the composition" and "the device," respectively. A liquid crystal display device is a generic term for a liquid crystal display panel and a liquid crystal display module. The "liquid crystal compound" is a generic term for a compound having a liquid crystal phase such as a nematic phase and a smectic phase, and also for a compound having no liquid crystal phases but being useful as a component of a composition. The useful compound has a six-membered ring such as 1,4-cyclohexylene and 1,4-phenylene, and a rod-like molecular structure. An optically active compound and a polymerizable compound may occasionally be added to the composition. Even in the case where these compounds are liquid crystal compounds, the compounds are classified as an additive herein. At least one compound selected from the group of compounds represented by formula (1) may occasionally be abbreviated to "the compound (1)." "The compound (1)" means one compound, or two or more compounds represented by formula (1). The same rules apply to compounds represented by the other formulas. "Arbitrary" is used not only in cases when the position is arbitrary but also in cases when the number is arbitrary. However, it is not used in cases when the number is 0 (zero).

A higher limit of the temperature range of a nematic phase may occasionally be abbreviated to "the maximum temperature." A lower limit of the temperature range of a nematic phase may occasionally be abbreviated to "the minimum temperature." That "a specific resistance is large" means that a composition has a large specific resistance at room temperature and also at a temperature close to the maximum temperature of a nematic phase in the initial stage, and that the composition has a large specific resistance at room temperature and also at a temperature close to the maximum temperature of a nematic phase even after it has been used for a long time. That "a voltage holding ratio is large" means that a device has a large voltage holding ratio at room temperature and also at a temperature close to the maximum temperature of a nematic phase in the initial stage, and that the device has a large voltage holding ratio at room temperature and also at a temperature close to the maximum temperature of a nematic phase even after it has been used for a long time. When characteristics such as optical anisotropy are explained, values which are obtained according to the measuring methods described in Examples will be used. A first component means one compound, or two or more compounds. "The ratio of the first component" means the percentage by weight (% by weight) of the first component based on the total weight of the liquid crystal composition. The same rule applies to the ratio of a second component and so forth. The ratio of an additive mixed into the composition means the percentage by weight (% by weight) or weight parts per million (ppm) based on the total weight of the liquid crystal composition.

The symbol $R^1$ is used for a plurality of compounds in the chemical formulas of component compounds. The meanings of two arbitrary $R^1$ may be identical or different in these compounds. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. The same rule applies to the symbols $R^2$, $X^1$ and so forth.

One of the advantages of the invention is to provide a liquid crystal composition that satisfies at least one characteristic among characteristics such as a high maximum temperature of a nematic phase, a low minimum temperature of a nematic phase, a small viscosity, a large optical anisotropy, a large dielectric anisotropy, a large specific resistance, a high stability to ultraviolet light, and a high stability to heat. Another advantage of the invention is to provide a liquid crystal composition that is suitably balanced regarding at least two of the characteristics. A further advantage of the invention is to provide a liquid crystal display device that contains the liquid crystal composition. An additional advantage of the invention is to provide a liquid crystal composition that has a large optical anisotropy, a large dielectric anisotropy, a high stability to ultraviolet light and so forth, and is to provide an AM device that has a short response time, a large voltage holding ratio, a large contrast ratio, a long service life and so forth.

The liquid crystal composition of the invention satisfied at least one characteristic among characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat. The liquid crystal composition was suitably balanced regarding at least two characteristics. The liquid crystal display device contained the liquid crystal composition. The liquid crystal composition had a large optical anisotropy, a large dielectric anisotropy, a high stability to ultraviolet light and so forth, and the AM device had a short response time, a large voltage holding ratio, a large contrast ratio, a long service life and so forth.

The invention includes the following items.

Item 1. A liquid crystal composition having a nematic phase that includes two components, wherein the first component is at least one compound selected from the group of compounds represented by formula (1), and the second component is at least one compound selected from the group of compounds represented by formula (2):

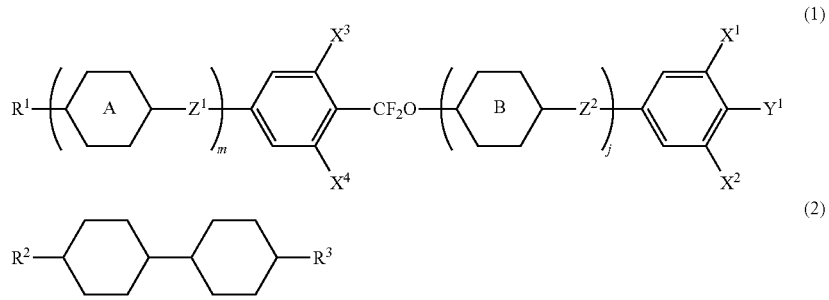

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^2$ and $R^3$ are each independently alkenyl having 2 to 12 carbons; ring A and ring B are each independently 1,4-cyclohexylene, 1,4-phenylene, 2-fluoro-1,4-phenylene, 3-fluoro-1,4-phenylene, 3,5-difluoro-1,4-phenylene or pyrimidine-2,5-diyl; $Z^1$ and $Z^2$ are each independently a single bond, ethylene, carbonyloxy or difluoromethyleneoxy; $X^1, X^2, X^3$ and $X^4$ are each independently hydrogen or fluorine; $Y^1$ is fluorine, chlorine or trifluoromethoxy; and m and j are each independently 0, 1, 2 or 3 and the sum of m and j is 2 or 3.

Item 2. The liquid crystal composition according to item 1, wherein the first component is at least one compound selected from the group of compounds represented by formulas (1-1) to (1-9):

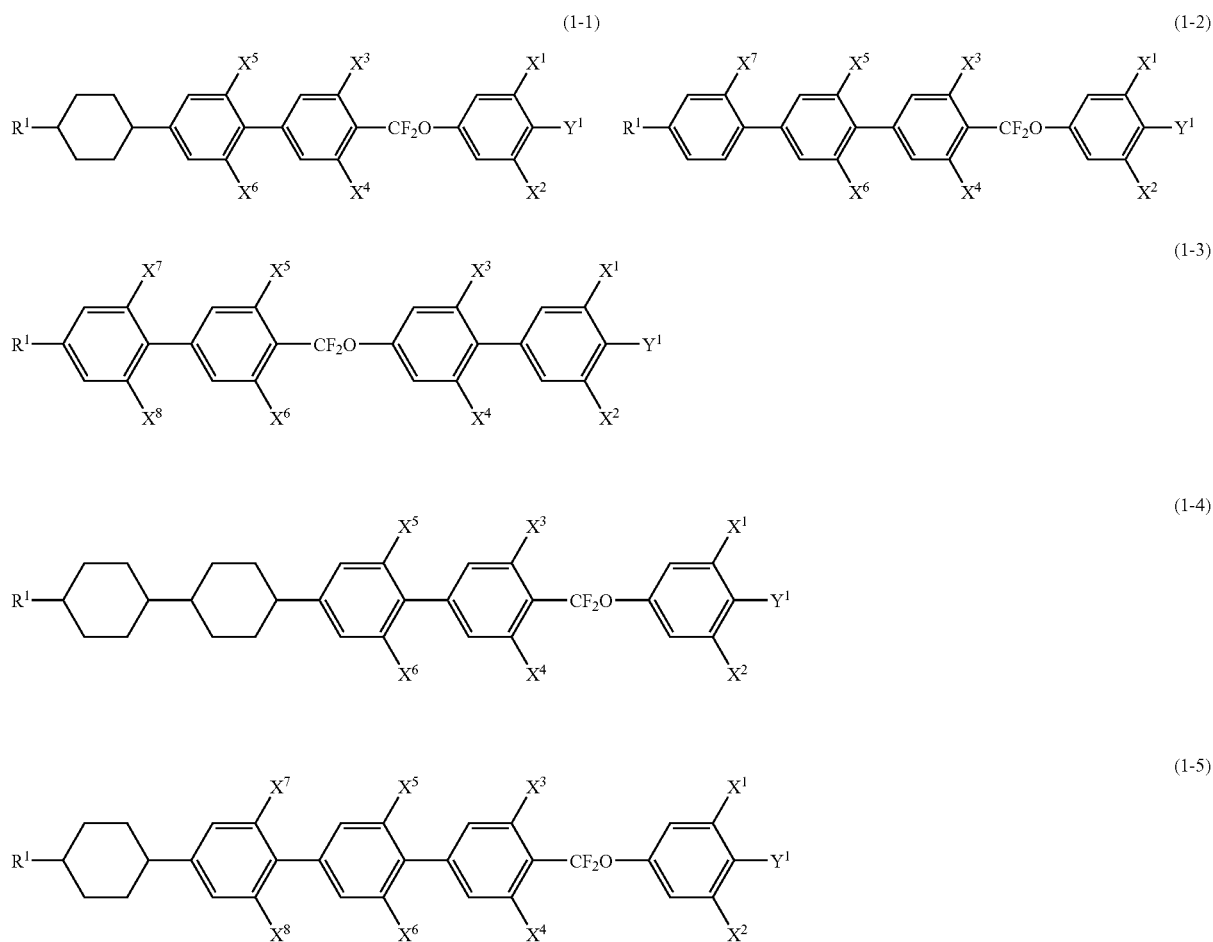

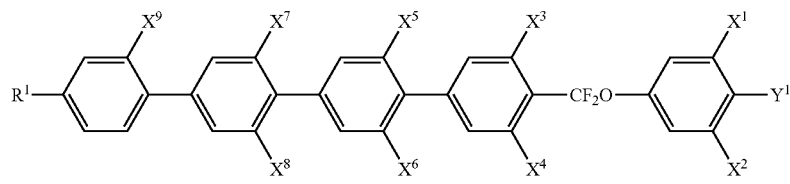

(1-6)

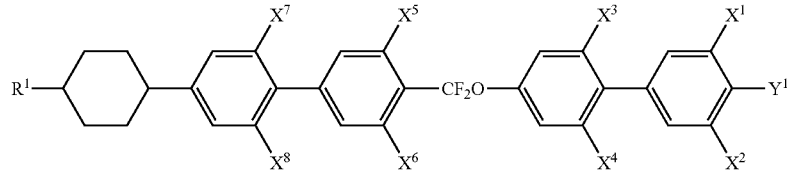

(1-7)

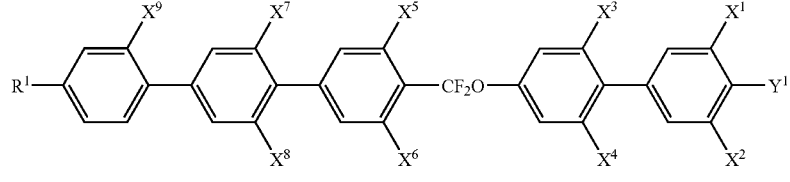

(1-8)

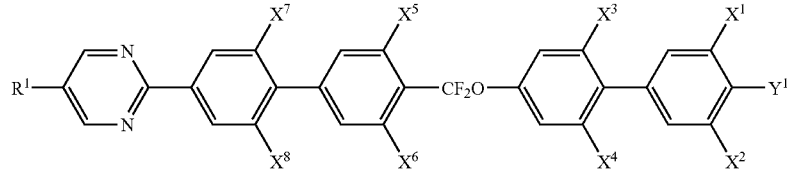

(1-9)

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^1, X^2, X^3, X^4, X^5, X^6, X^7, X^8$ and $X^9$ are each independently hydrogen or fluorine; and $Y^1$ is fluorine, chlorine or trifluoromethoxy.

Item 3. The liquid crystal composition according to item 2, wherein the first component is at least one compound selected from the group of compounds represented by formula (1-1).

Item 4. The liquid crystal composition according to item 2, wherein the first component is at least one compound selected from the group of compounds represented by formula (1-2).

Item 5. The liquid crystal composition according to item 2, wherein the first component is at least one compound selected from the group of compounds represented by formula (1-5).

Item 6. The liquid crystal composition according to item 2, wherein the first component is at least one compound selected from the group of compounds represented by formula (1-8).

Item 7. The liquid crystal composition according to item 2, wherein the first component is a mixture of at least one compound selected from the group of compounds represented by formula (1-1) and at least one compound selected from the group of compounds represented by formula (1-2).

Item 8. The liquid Crystal composition according to any one of items 1 to 7, wherein the ratio of the first component is in the range of approximately 5% to approximately 40% by weight and the ratio of the second component is in the range of approximately 20% to approximately 95% by weight, based on the total weight of the liquid crystal composition.

Item 9. The liquid crystal composition according to any one of items 1 to 8, wherein the composition further includes at least one compound selected from the group of compounds represented by formula (3) as a third component:

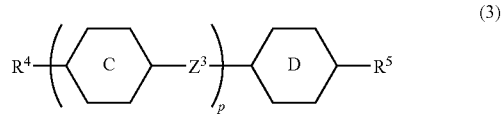

(3)

wherein $R^4$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^5$ is alkyl having 1 to 12 carbons or alkoxy having 1 to 12 carbons; ring C and ring D are each independently 1,4-cyclohexylene, 1,4-phenylene, 2-fluoro-1,4-phenylene, 3-fluoro-1,4-phenylene or 2,5-difluoro-1,4-phenylene; $Z^3$ is independently a single bond, ethylene or carbonyloxy; and p is 1, 2 or 3.

Item 10. The liquid crystal composition according to item 9, wherein the third component is at least one compound selected from the group of compounds represented by formulas (3-1) to (3-11):

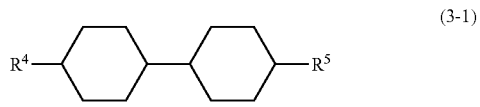

(3-1)

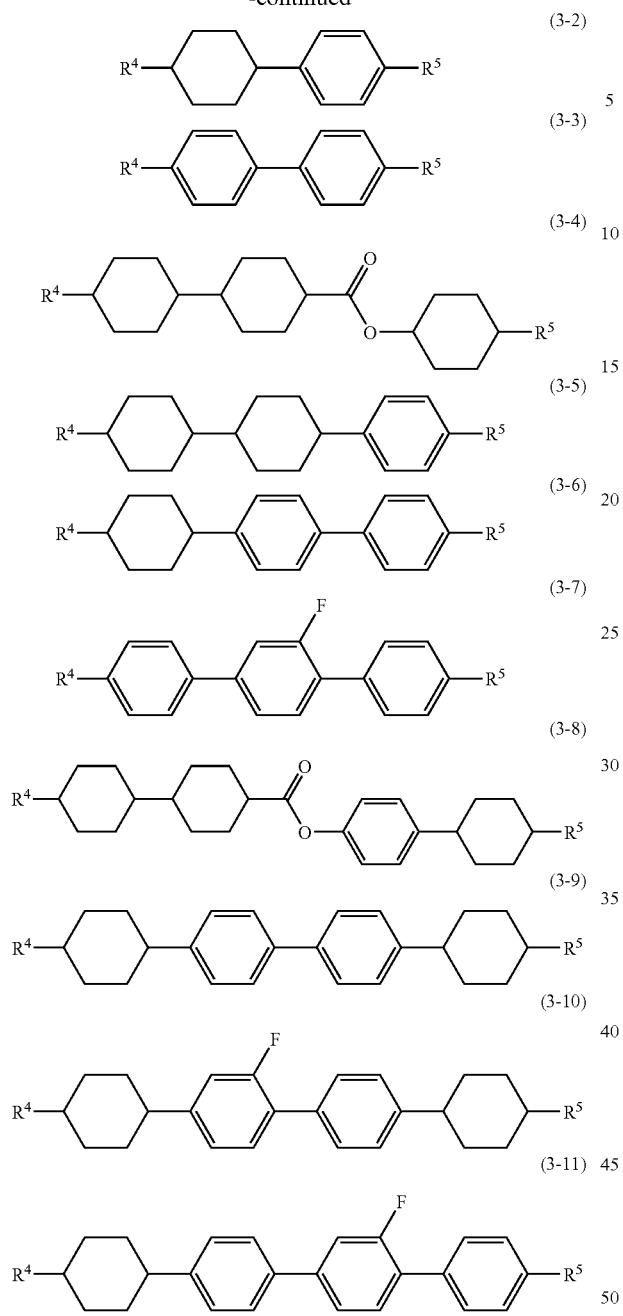

(3-2)
(3-3)
(3-4)
(3-5)
(3-6)
(3-7)
(3-8)
(3-9)
(3-10)
(3-11)

wherein R⁴ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; and R⁵ is alkyl having 1 to 12 carbons or alkoxy having 1 to 12 carbons.

Item 11. The liquid crystal composition according to item 10, wherein the third component is at least one compound selected from the group of compounds represented by formula (3-1).

Item 12. The liquid crystal composition according to item 10, wherein the third component is a mixture of at least one compound selected from the group of compounds represented by formula (3-1) and at least one compound selected from the group of compounds represented by formula (3-5).

Item 13. The liquid crystal composition according to item 10, wherein the third component is a mixture of at least one compound selected from the group of compounds represented by formula (3-1) and at least one compound selected from the group of compounds represented by formula (3-7).

Item 14. The liquid crystal composition according to item 10, wherein the third component is a mixture of at least one compound selected from the group of compounds represented by formula (3-1) and at least one compound selected from the group of compounds represented by formula (3-5) and at least one compound selected from the group of compounds represented by formula (3-7).

Item 15. The liquid crystal composition according to any one of items 9 to 14, wherein the ratio of the third component is in the range of approximately 5% to approximately 60% by weight based on the total weight of the liquid crystal composition.

Item 16. The liquid crystal composition according to any one of items 1 to 15, wherein the composition further includes at least one compound selected from the group of compounds represented by formula (4) as a fourth component:

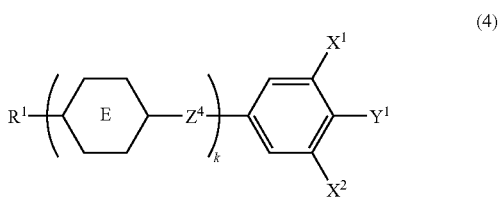

(4)

wherein R¹ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring E is independently 1,4-cyclohexylene, 1,3-dioxane-2,5-diyl, 1,4-phenylene 2-fluoro-1,4-phenylene, 3-fluoro-1,4-phenylene, 3,5-difluoro-1,4-phenylene or pyrimidine-2,5-diyl; Z⁴ is independently a single bond, ethylene, carbonyloxy or difluoromethyleneoxy; X¹ and X² are each independently hydrogen or fluorine; Y¹ is fluorine, chlorine or trifluoromethoxy; and k is 1 or 2.

Item 17. The liquid crystal composition according to item 16, wherein the fourth component is at least one compound selected from the group of compounds represented by formulas (4-1) to (4-18):

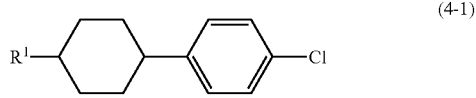

(4-1)

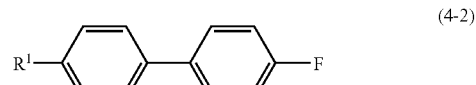

(4-2)

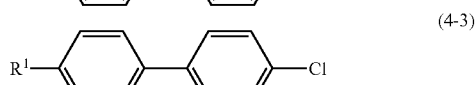

(4-3)

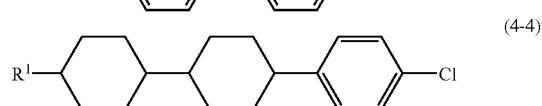

(4-4)

(4-5) 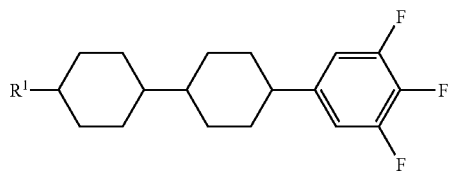

(4-6) 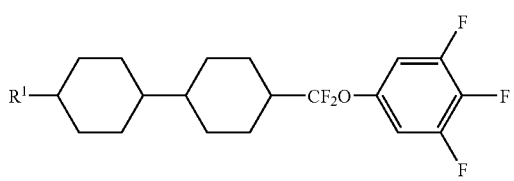

(4-7) 

(4-8) 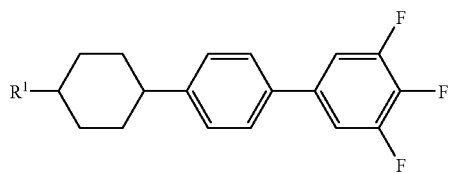

(4-9) 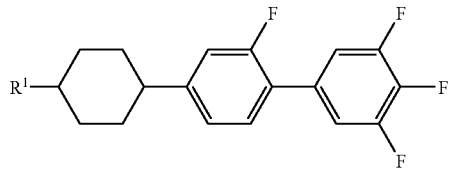

(4-10) 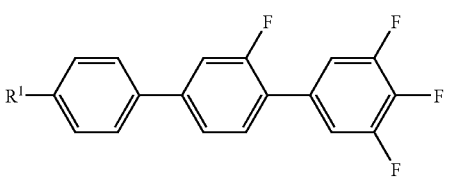

(4-11) 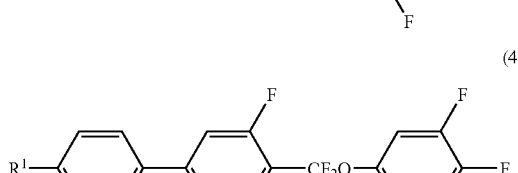

(4-12) 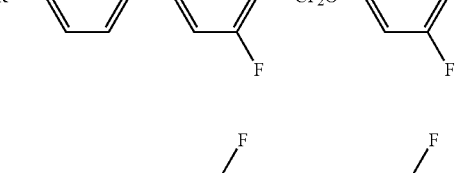

(4-13) 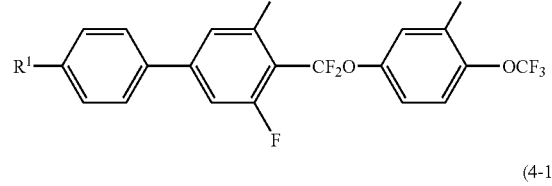

(4-14) 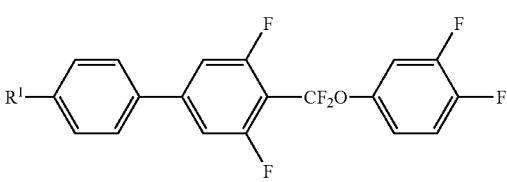

(4-15) 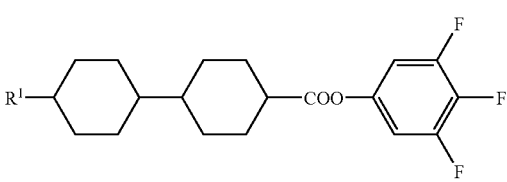

(4-16) 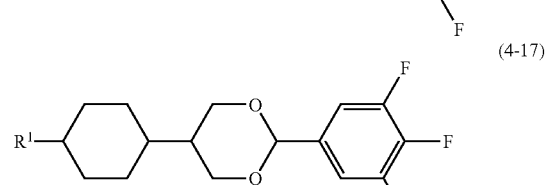

(4-17) 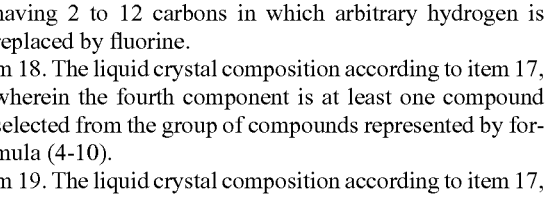

(4-18) 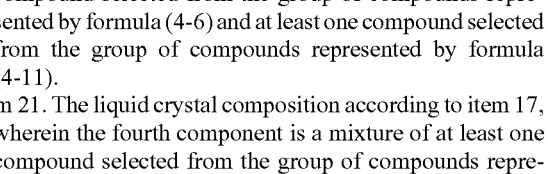

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 18. The liquid crystal composition according to item 17, wherein the fourth component is at least one compound selected from the group of compounds represented by formula (4-10).

Item 19. The liquid crystal composition according to item 17, wherein the fourth component is at least one compound selected from the group of compounds represented by formula (4-11).

Item 20. The liquid crystal composition according to item 17, wherein the fourth component is a mixture of at least one compound selected from the group of compounds represented by formula (4-6) and at least one compound selected from the group of compounds represented by formula (4-11).

Item 21. The liquid crystal composition according to item 17, wherein the fourth component is a mixture of at least one compound selected from the group of compounds represented by formula (4-10) and at least one compound selected from the group of compounds represented by formula (4-11).

Item 22. The liquid crystal composition according to any one of items 16 to 21, wherein the ratio of the fourth component is in the range of approximately 5% to approximately 40% by weight based on the total weight of the liquid crystal composition.

Item 23. The liquid crystal composition according to any one of items 1 to 22, wherein the maximum temperature of a nematic phase is approximately 70° C. or higher, the optical anisotropy (25° C.) at a wavelength of 589 nm is approximately 0.08 or more, and the dielectric anisotropy (25° C.) at a frequency of 1 kHz is approximately 2 or more.

Item 24. A liquid crystal display device including the liquid crystal composition according to any one of items 1 to 23.

Item 25. The liquid crystal display device according to item 24, wherein an operating mode of the liquid crystal display device is a TN mode, an OCB mode, an IPS mode or a PSA mode, and a driving mode of the liquid crystal display device is an active matrix mode.

The invention further includes the following items: (1) the composition described above that further includes an optically active compound; (2) the composition described above that further includes an additive such as an antioxidant, an ultraviolet light absorbent, an antifoaming agent, a polymerizable compound and/or a polymerization initiator; (3) an AM device that includes the composition described above; (4) a device having a mode of TN, BCE, OCB, IPS or PSA and including the composition described above; (5) a device having a transmission type and including the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, main characteristics of the component compounds and main effects of the compounds on the composition will be explained. Third, a combination of components in the composition, desirable ratios of the component compounds and the basis thereof will be explained. Fourth, a desirable embodiment of the component compounds will be explained. Fifth, examples of the component compounds will be shown. Sixth, additives that may be mixed into the composition will be explained. Seventh, methods for synthesizing the component compound will be explained. Last, use of the composition will be explained.

First, the constitution of component compounds in the composition will be explained. The composition of the invention is classified into the composition A and the composition B. The composition A may further contain other liquid crystal compounds, an additive, an impurity and so forth. "The other liquid crystal compounds" are different from the compound (1), the compound (2), the compound (3) and the compound (4). Such compounds are mixed into the composition for the purpose of further adjusting characteristics of the composition. Of the other liquid crystal compounds, a smaller amount of a cyano compound is more desirable in view of its stability to heat or ultraviolet light. A more desirable ratio of the cyano compound is approximately 0% by weight. The additive includes an optically active compound, an antioxidant, an ultraviolet light absorbent, a coloring matter, an antifoaming agent, a polymerizable compound, and a polymerization initiator. The impurity is a compound and so forth contaminated in a process such as the synthesis of component compounds. Even in the case where the compound is liquid crystalline, it is classified as an impurity herein.

The composition B is essentially consisting of compounds selected from the group of the compound (1), the compound (2), the compound (3) and the compound (4). The term "essentially" means that the composition may contain an additive and an impurity, but does not contain the other liquid crystal compounds which are different from these compounds. The composition B has a smaller number of components than the composition A. The composition B is preferable to the composition A in view of cost reduction. The composition A is preferable to the composition B in view of the fact that physical properties can be further adjusted by mixing the other liquid crystal compounds.

Second, main characteristics of the component compounds and main effects of the compounds on the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classified on the basis of a qualitative comparison among the component compounds, and 0 (zero) means that "a value is nearly zero."

TABLE 2

Characteristics of Compounds

| | Compounds | | | |
|---|---|---|---|---|
| | Compound (1) | Compound (2) | Compound (3) | Compound (4) |
| Maximum temperature | M-L | S-M | S-L | S-M |
| Viscosity | M-L | S | S-M | M-L |
| Optical Anisotropy | M-L | S | S-L | M-L |
| Dielectric Anisotropy | M-L | 0 | 0 | S-L |
| Specific Resistance | L | L | L | L |

Main effects of the component compounds on the characteristics of the composition upon mixing the component compounds to the composition are as follows. The compound (1) increases the optical anisotropy and increases the dielectric anisotropy. The compound (2) decreases the viscosity. The compound (3) increases the maximum temperature or decreases the minimum temperature. The compound (4) decreases the minimum temperature and increases the dielectric anisotropy.

Third, a combination of the components in the composition, desirable ratios of the component compounds and the basis thereof will be explained. The combination of the components in the composition is the first and second components, the first, second and third components, the first, second and fourth components, and the first, second, third and fourth components. A desirable combination of components in the composition are the first, second and third components, and the first, second, third and fourth components.

A desirable ratio of the first component is approximately 5% by weight or more for increasing the optical anisotropy and increasing the dielectric anisotropy, and is approximately 40% by weight or less for decreasing the minimum temperature. A more desirable ratio is in the range of approximately 5% to approximately 30% by weight. An especially desirable ratio is in the range of approximately 5% to approximately 20% by, weight.

A desirable ratio of the second component is approximately 20% by weight or more for decreasing the viscosity, and is approximately 95% by weight or less for increasing the dielectric anisotropy. A more desirable ratio is in the range of approximately 25% to approximately 80% by weight. An especially desirable ratio is in the range of approximately 30% to approximately 70% by weight.

A desirable ratio of the third component is approximately 5% by weight or more for increasing the maximum temperature or decreasing the viscosity, and is approximately 60% by weight or less for increasing the dielectric anisotropy. A more desirable ratio is in the range of approximately 10% to approximately 55% by weight. An especially desirable ratio is in the range of approximately 15% to approximately 50% by weight.

The fourth component is suitable for the preparation of a composition having especially large the dielectric anisotropy. A desirable ratio of this component is in the range of approximately 5% by weight to 40 by weight. A more desirable ratio is in the range of approximately 5% by weight to 35 by weight. An especially desirable ratio is in the range of approximately 5% to approximately 30% by weight.

Fourth, a desirable embodiment of the component compounds will be explained. $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable $R^1$ is alkyl having 1 to 12 carbons for increasing the stability to ultraviolet light or heat. $R^2$ and $R^3$ are each independently alkenyl having 2 to 12 carbons. $R^4$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable $R^4$ is alkenyl having 2 to 12 carbons for decreasing the minimum temperature. $R^5$ is alkyl having 1 to 12 carbons or alkoxy having 1 to 12 carbons. Desirable $R^5$ is alkyl having 1 to 12 carbons for increasing the stability to ultraviolet light or heat.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH═CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity and for something. C is preferable in the alkenyl such as 2-butenyl, 2-pentenyl and 2-hexenyl. In the alkenyl, straight-chain alkenyl is preferable to branched-chain alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

Ring A and ring B are each independently 1,4-cyclohexylene, 1,4-phenylene, 2-fluoro-1,4-phenylene, 3-fluoro-1,4-phenylene, 3,5-difluoro-1,4-phenylene or pyrimidine-2,5-diyl, and two arbitrary ring A among these may be identical or different when m is 2 or 3, and two arbitrary ring B among these may be identical or different when j is 2 or 3. Desirable ring A or ring B is 1,4-phenylene for increasing the optical anisotropy. Ring C and ring D are each independently 1,4-cyclohexylene, 1,4-phenylene, 2-fluoro-1,4-phenylene, 3-fluoro-1,4-phenylene or 2,5-difluoro-1,4-phenylene, and two arbitrary ring C among these may be identical or different when p is 2 or 3. Desirable ring C or ring D is 1,4-cyclohexylene for decreasing the viscosity and 1,4-phenylene for increasing the optical anisotropy. Ring E is independently 1,4-cyclohexylene, 1,3-dioxane-2,5-diyl, 1,4-phenylene, 2-fluoro-1,4-phenylene 3-fluoro-1,4-phenylene 3,5-difluoro-1,4-phenylene or pyrimidine-2,5-diyl, and two arbitrary ring E may be identical or different when k is 2. Desirable ring E is 1,4-phenylene for increasing the optical anisotropy.

$Z^1$, $Z^2$ and $Z^4$ are each independently a single bond, ethylene, carbonyloxy or difluoromethyleneoxy, and two arbitrary $Z^1$ among these may be identical or different when m is 2 or 3 and two arbitrary $Z^2$ among these may be identical or different when j is 2 or 3 and two arbitrary $Z^4$ may be identical or different when k is 2. Desirable $Z^1$ or $Z^2$ is a single bond for decreasing the viscosity. Desirable $Z^4$ is difluoromethyleneoxy for increasing the dielectric anisotropy. $Z^3$ is independently a single bond, ethylene, or carbonyloxy, and two arbitrary $Z^3$ among these may be identical or different when p is 2 or 3. Desirable $Z^3$ is a single bond for decreasing the viscosity.

$X^1$, $X^2$, $X^3$, $X^4$, $X^5$, $X^6$, $X^7$, $X^8$, and $X^9$ are each independently hydrogen or fluorine, and preferably at least two of $X^1$, $X^2$, $X^3$, $X^4$, $X^5$, $X^6$, $X^7$, $X^8$ and $X^9$ have fluorine for increasing the dielectric anisotropy.

$Y^1$ is fluorine, chlorine or trifluoromethoxy. Desirable $Y^1$ is fluorine for decreasing the minimum temperature.

m and j are each independently 0, 1, 2 or 3 and the sum of m and j is 3 or less. Desirable m is 2 for increasing the maximum temperature. Desirable j is 0 for decreasing the minimum temperature. p is 1, 2 or 3. Desirable p is 1 for decreasing the viscosity. k is 1 or 2. Desirable k is 2 for decreasing the minimum temperature.

Fifth, examples of the component compounds will be shown. In the desirable compounds described below, $R^6$ is straight-chain alkyl having 1 to 12 carbons. $R^7$ is straight-chain alkyl having 1 to 12 carbons or straight-chain alkoxy having 1 to 12 carbons. $R^8$ is straight-chain alkyl having 1 to 12 carbons or straight-chain alkenyl having 2 to 12 carbons. $R^9$ and $R^{10}$ are each independently straight-chain alkenyl having 2 to 12 carbons. With regard to the configuration of 1,4-cyclohexylene in these Compounds, trans is preferable to cis for increasing the maximum temperature.

Desirable compound (1) are the compounds (1-1-1) to (1-1-3), the compounds (1-2-1) to (1-2-3), the compounds (1-3-1) to (1-3-2), the compounds (1-4-1) to (1-4-2), the compounds (1-5-1) to (1-5-3), the compounds (1-6-1) to (1-6-2), the compounds (1-7-1) to (1-7-2), the compounds (1-8-1) to the compound (1-8-2) and the compound (1-9-1). More desirable compound (1) are the compound (1-1-1), the compound (1-1-2), the compound (1-1-3), the compound (1-2-3), the compound (1-4-2), the compound (1-5-3), the compound (1-6-2), the compound (1-7-2) and the compound (1-8-2). Especially desirable compound (1) are the compound (1-1-1), the compound (1-1-2), the compound (1-1-3), the compound (1-2-3) and the compound (1-8-2). Desirable compound (2) is the compound (2-1-1). Desirable compound (3) are the compounds (3-1-1) to (3-11-1). More desirable compound (3) are the compound (3-1-1), the compound (3-3-1), the Compound (3-5-1), the compound (3-7-1), the compound (3-8-1) and the compound (3-11-1). Especially desirable compound (3) are the compound (3-1-1), the compound (3-5-1), the compound (3-7-1) and the compound (3-11-1). Desirable compound (4) are the compounds (4-1-1) to (4-18-1). More desirable compound (4) are the compound (4-6-1), the compound (4-9-1), the compound (4-10-1), the compound (4-11-1) and the compound (4-12-1). Especially desirable compound (4) are the compound (4-6-1), the compound (4-9-1), the compound (4-10-1) and the compound (4-11-1).

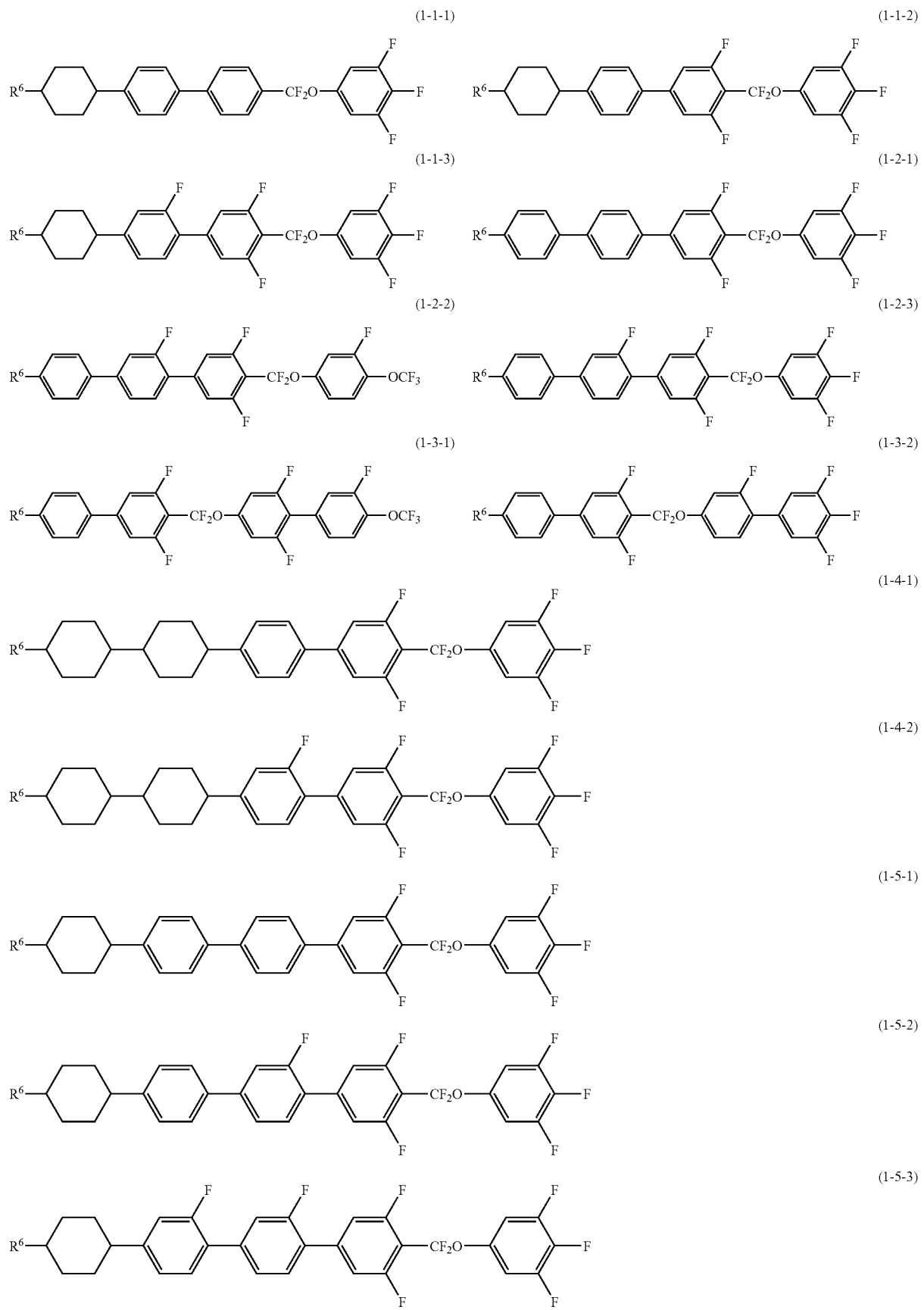

-continued
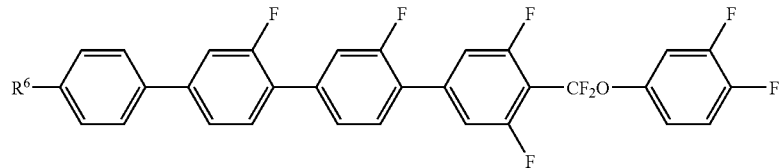
(1-6-1)
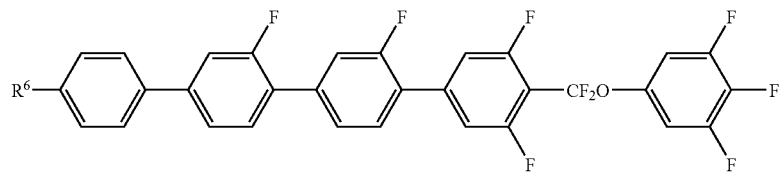
(1-6-2)
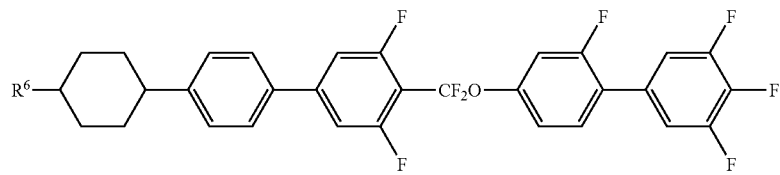
(1-7-1)
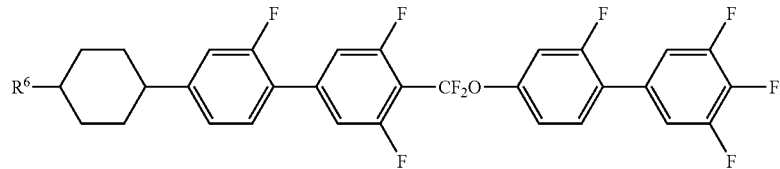
(1-7-2)
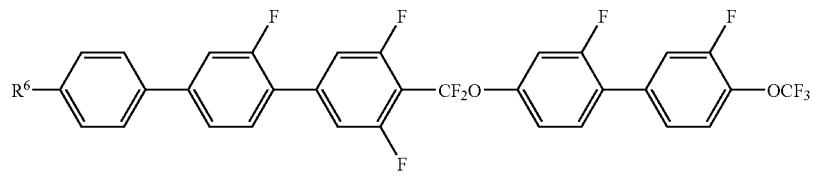
(1-8-1)
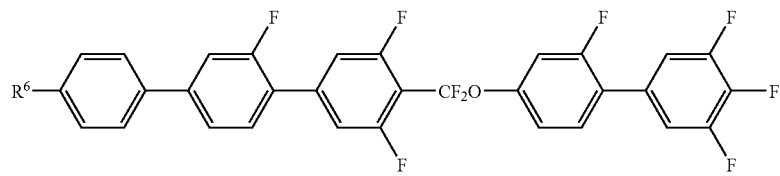
(1-8-2)
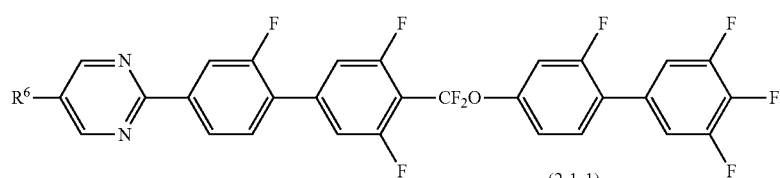
(1-9-1)
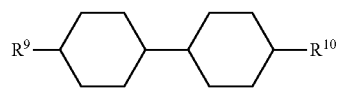
(2-1-1)
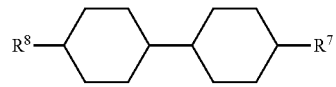
(3-1-1)
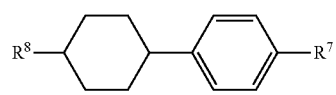
(3-2-1)
-continued
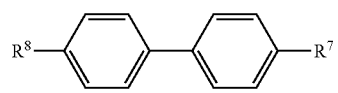
(3-3-1)
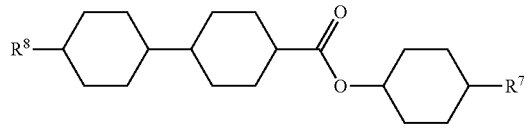
(3-4-1)

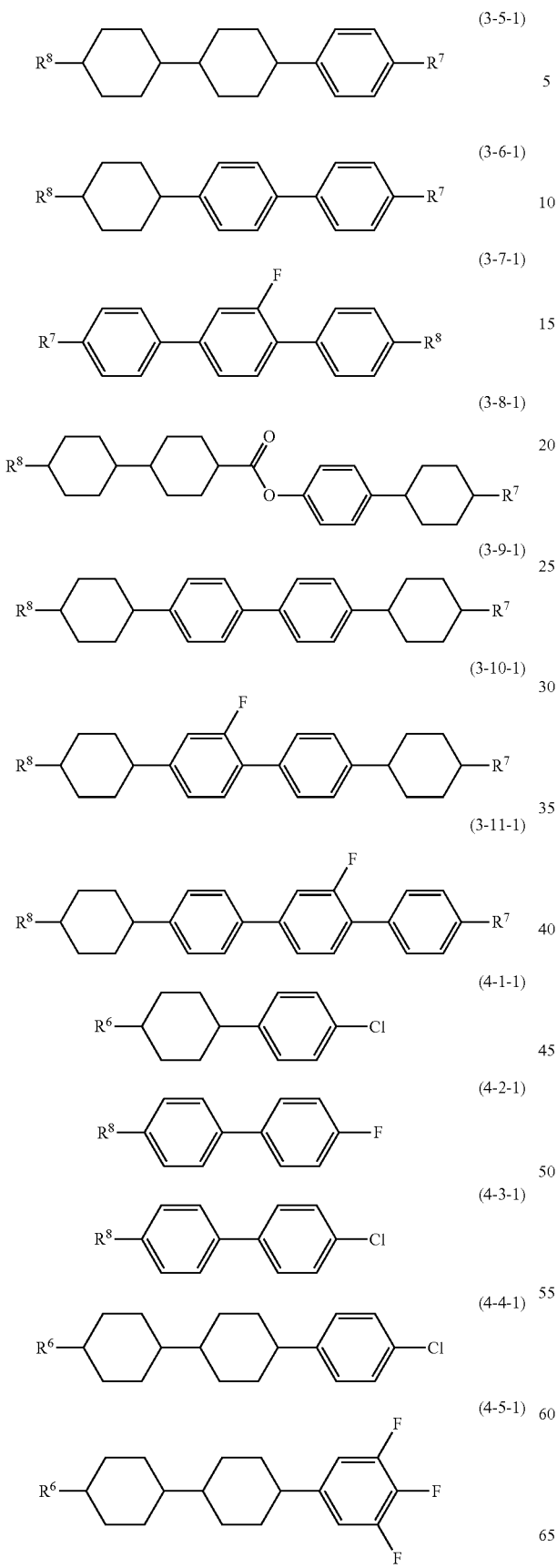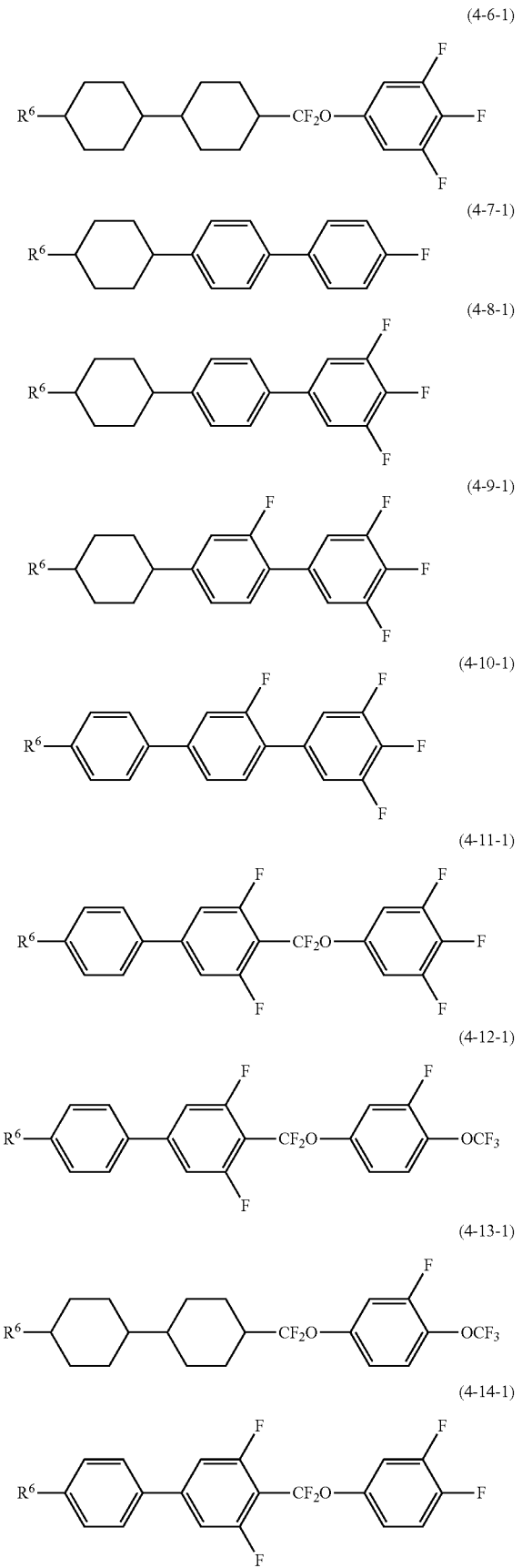

-continued (4-15-1)
(4-16-1)
(4-17-1)
(4-18-1)

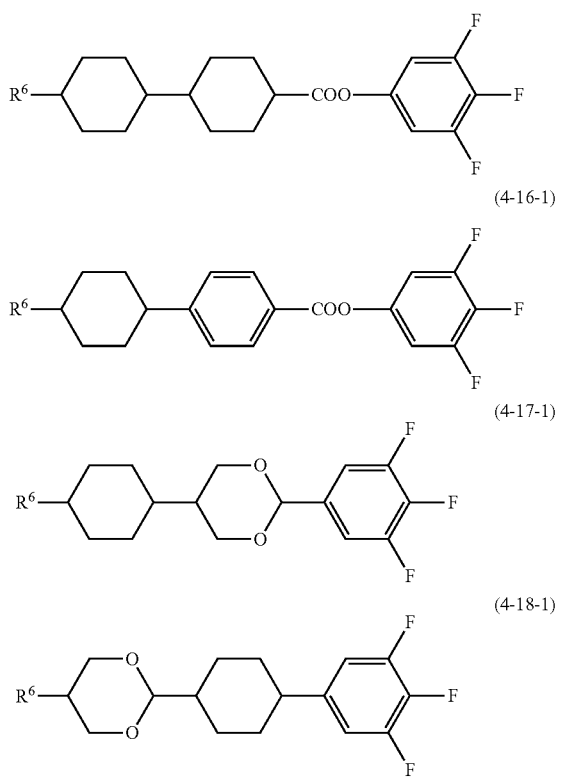

Sixth, additives which may be mixed into the composition will be explained. The additives include an optically active compound, an antioxidant, an ultraviolet light absorbent, a coloring matter, an antifoaming agent, a polymerizable compound and a polymerization initiator. The optically active compound is mixed into the composition for the purpose of inducing a helical structure and giving a twist angle in liquid crystals. Examples of the optically active compound include the compounds (5-1) to (5-4) below. A desirable ratio of the optically active compound is approximately 5% by weight or less, and a more desirable ratio is in the range of approximately 0.01% to approximately 2% by weight.

(5-1)
(5-2)

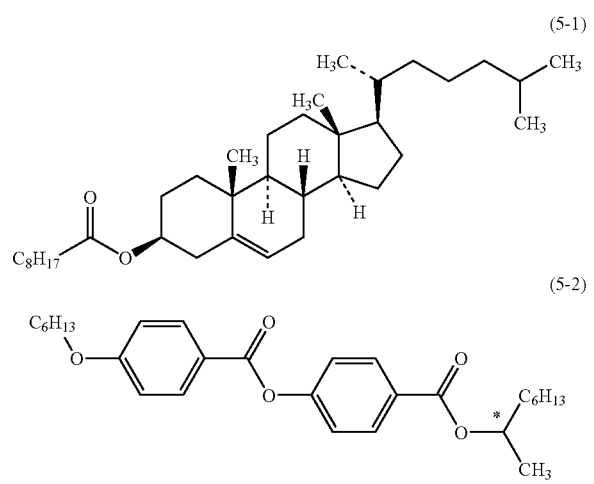

-continued (5-3)
(5-4)

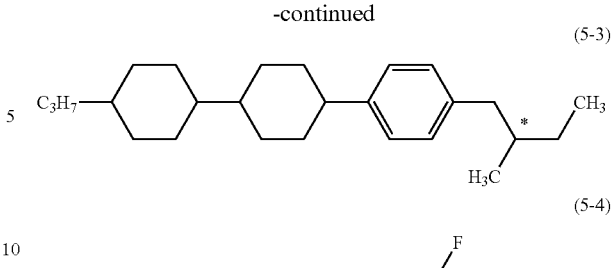

An antioxidant is mixed into the composition in order to prevent a decrease in specific resistance Caused by heating in air, or to maintain a large voltage holding ratio at room temperature and also at a temperature close to the maximum temperature of a nematic phase even after the device has been used for a long time.

(6)

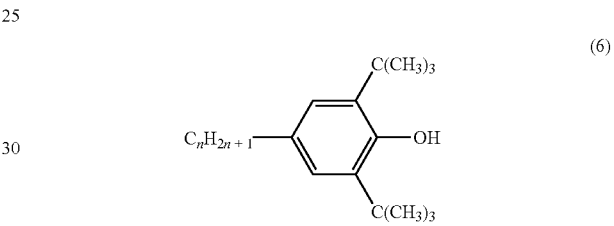

Desirable examples of the antioxidant include the compound (6) wherein n is an integer of from 1 to 9. In the compound (6), desirable n is 1, 3, 5, 7 or 9. More desirable n is 1 or 7. The compound (6) wherein n is 1, is effective in preventing a decrease of the specific resistance caused by heating in air because it has a large volatility. The compound (6) wherein n is 7 is effective in maintaining a large voltage holding ratio at room temperature and also at a temperature close to the maximum temperature of a nematic phase even after the device has been used for a long time, because it has a small volatility. A desirable ratio of the antioxidant is approximately 50 ppm or more for achieving its effect and is approximately 600 ppm or less for avoiding a decrease of the maximum temperature or avoiding an increase of the minimum temperature. A more desirable ratio is in the range of approximately 100 ppm to approximately 300 ppm.

Desirable examples of the ultraviolet light absorbent include a benzophenone derivative, a benzoate derivative and a triazole derivative. A light stabilizer such as an amine having steric hindrance is also desirable. A desirable ratio of the ultraviolet light absorbent and the light stabilizer is approximately 50 ppm or more for achieving its effect and is approximately 10,000 ppm or less for avoiding a decrease of the maximum temperature or avoiding an increase of the minimum temperature. A more desirable ratio is in the range of approximately 100 ppm to approximately 10,000 ppm.

A dichroic dye such as an azo dye or an anthraquinone dye is mixed into the composition for adjusting to a device having a guest host (GH) mode. A desirable ratio of the coloring matter is in the range of approximately 0.01% to approximately 10% by weight. An antifoaming agent such as dimethyl silicone oil or methyl phenyl silicone oil is mixed into the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

A polymerizable compound is mixed into the composition for adjusting to a device having a PSA (polymer sustained alignment) mode. Desirable examples of the polymerizable compound include compounds having a polymerizable group, such as acrylates, methacrylates, vinyl compounds, vinyloxy compounds, propenyl ethers, epoxy compounds (oxirane, oxetane) and vinyl ketones. Especially desirable examples of the polymerizable compound are acrylate derivatives or methacrylate derivatives. A desirable ratio of the polymerizable compound is approximately 0.05% by weight or more for achieving its effect and is approximately 10% by weight or less for avoiding a poor display. A more desirable ratio is in the range of approximately 0.1% to approximately 2% by weight. The polymerizable compound is preferably polymerized on irradiation with ultraviolet light or the like in the presence of a suitable initiator such as a photoinitiator. Suitable conditions for polymerization, suitable types of the initiator and suitable amounts thereof are known to a person skilled in the art and are described in the literature. For example, Irgacure 651 (registered trademark), Irgacure 184 (registered trademark) or Darocure 1173 (registered trademark) (Ciba Japan K.K.), which is a photopolymerization initiator, is suitable for radical polymerization. The polymerizable compound includes the photopolymerization initiator preferably in the range of approximately 0.1% to approximately 5% by weight, and most preferably in the range of approximately 1% to approximately 3% by weight.

Seventh, methods for synthesizing the component compounds will be explained. These compounds can be synthesized by known methods. The synthetic methods will be exemplified as follows. The compound (1-2-3) is synthesized by the method described in JP H10-251186 A (1998). The compound (2-1-1) is synthesized by the method described in JP H9-77692 A (1997). The compound (3-5-1) is synthesized by the method described in JP S57-165328 A (1982) The compounds (4-5-1) and (4-8-1) are synthesized by the method described in JP H2-233626 A (1990). An antioxidant is commercially available. The compound of formula (6), wherein n is 1, is available from Sigma-Aldrich Corporation, The compound (6), wherein n is 7, and so forth are synthesized according to the method described in U.S. Pat. No. 3,660,505.

The compounds that synthetic methods were not described above can be synthesized according to the methods described in books such as ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), and NEW EXPERIMENTAL CHEMISTRY COURSE (Shin Jikken Kagaku Kouza, in Japanese title) (Maruzen, Inc.). The composition is prepared according to known methods using the compounds thus obtained. For example, the component compounds are mixed and dissolved in each other by heating.

Last, use of the composition will be explained. The composition of the present invention mainly has a minimum temperature of approximately −10° C. or lower, a maximum temperature of approximately 70° C. or higher, and an optical anisotropy in the range of approximately 0.07 to approximately 0.20. The device containing the composition has a large voltage holding ratio. The composition is suitable for an AM device. The composition is suitable especially for an AM device having a transmission type. The composition having an optical anisotropy in the range of approximately 0.08 to approximately 0.25 and additionally in the range of approximately 0.10 to approximately 0.30 may be prepared by regulating ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, VA or PSA. It is especially desirable to use the composition for the AM device having the TN, OCB or IPS mode. These devices may be of a reflection type, a transmission type or a semi-transmission type. It is desirable to use the composition for a device having the transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three-dimensional network-polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

A composition and a compound were a subject for measurement in order to evaluate the composition and the compound to be included in the composition. When the subject for measurement was a composition, the composition itself was measured as a sample, and the value obtained was described here. When the subject for measurement was a compound, a sample for measurement was prepared by mixing the compound (15% by weight) and mother liquid crystals (85% by weight). Characteristic values of the compound were calculated from values obtained by measurement, according to a method of extrapolation. That is: (extrapolated value)=[(measured value of a sample for measurement)−0.85×(measured value of mother liquid crystals)]/0.15. When a smectic phase (or crystals) separated out at this ratio at 25° C., the ratio of the compound and the mother liquid crystals was changed step by step in the order of (10% by weight/90% by weight), (5% by weight/95% by weight), (1% by weight/99% by weight). Values of the maximum temperature, the optical anisotropy, the viscosity and the dielectric anisotropy with regard to the compound were obtained by the extrapolation.

The components of the mother liquid crystals were as follows. The ratio of each component is expressed in percentage by weight.

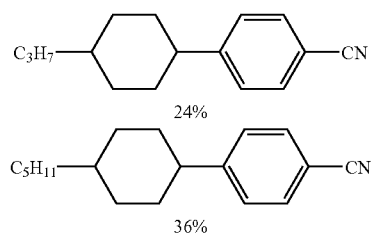

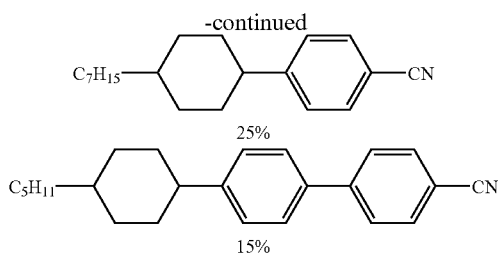

25%

15%

Characteristics were measured according to the following methods. Most methods are described in the Standards of Electronic Industries Association of Japan, EIAJ•ED-2521 A or those with some modifications.

Maximum Temperature of a Nematic Phase (NI; ° C.): A sample was placed on a hot plate in a melting point apparatus equipped with a polarizing microscope and was heated at the rate of 1° C. per minute. Temperature was measured when part of the sample began to change from a nematic phase to an isotropic liquid. A higher limit of the temperature range of a nematic phase may occasionally be abbreviated to "the maximum temperature."

Minimum Temperature of a Nematic Phase (Tc; ° C.): A sample having a nematic phase was put in glass vials and then kept in freezers at temperatures of 0° C., −10° C., −20° C., −30° C. and −40° C. for 10 days, and then the liquid crystal phases were observed. For example, when the sample remained the nematic phase at −20° C. and changed to crystals or a smectic phase at −30° C., Tc was expressed as $\leqq -20°$ C. A lower limit of the temperature range of a nematic phase may occasionally be abbreviated to "the minimum temperature."

Viscosity (bulk viscosity; η; measured at 20° C.; mPa·s): Viscosity was measured by use of an E-type viscometer.

Viscosity (rotational viscosity; γ1; measured at 25° C.; mPa·s): Measurement was carried out according to the method described in M. Imai, et al., Molecular Crystals and Liquid Crystals, Vol. 259, 37 (1995). A sample was poured into a TN device having the twist angle of 0 degrees and the distance between two glass substrates (cell gap) of 5 μm. The TN device was impressed with a voltage stepwise with an increment of 0.5 volt in the range of 16 to 19.5 volts. After a period of 0.2 second without impressed voltage, voltage impress was repeated under the conditions of only one rectangular wave (rectangular pulse; 0.2 second) and no voltage impressed (2 seconds). The peak current and the peak time of the transient current generated by the voltage impressed were measured. The value of rotational viscosity was obtained from the measured values and the calculating equation (8) in page 40 of the paper presented by M. Imai, et al. The value of dielectric anisotropy necessary for this calculation was obtained by use of the device that had been used for the present measurement of rotational viscosity, according to the method that will be described below.

Optical Anisotropy (refractive index anisotropy; Δn; measured at 25° C.): Measurement was carried out by use of an Abbe refractometer with a polarizing plate mounted on the ocular, on irradiation with light at a wavelength of 589 nm. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: Δn=n∥−n⊥.

Dielectric Anisotropy (Δ∈; measured at ° C.): A sample was poured into a TN device having the distance between two glass plates (cell gap) of 9 μm and the twist angle of 80°. Sine waves (10 V, 1 kHz) were impressed onto the device, and a dielectric constant (∈∥) in a major axis direction of liquid crystal molecules was measured after 2 seconds. Sine waves (0.5 V, 1 kHz) were impressed onto the device and a dielectric constant (∈⊥) in a minor axis direction of liquid crystal molecules was measured after 2 seconds. A value of the dielectric anisotropy was calculated from the equation: Δ∈=∈∥−∈⊥.

Threshold Voltage (Vth; measured at 25° C.; V): Measurement was carried out with an LCD evaluation system Model LCD-5100 made by Otsuka Electronics Co., Ltd. The light source was a halogen lamp. A sample was poured into a TN device having a normally white mode, in which the distance between two glass substrates (cell gap) was about 4.45/Δn (μm) and the twist angle was 80 degrees. Voltage to be impressed onto the device (32 Hz, rectangular waves) was stepwise increased in 0.02 V increments from 0 V up to 10 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 90% transmittance.

Voltage Holding Ratio (VHR-1; measured at 25° C.; %): A TN device used for measurement had a polyimide-alignment film, and the distance between two glass substrates (cell gap) was 5 μm. A sample was poured into the device, and then the device was sealed with an adhesive curable on irradiation with ultraviolet light. The device was impressed and charged with pulse voltage (60 microseconds at 5 V). A decreasing voltage was measured for 16.7 milliseconds with a high-speed voltmeter, and the area A between a voltage curve and a horizontal axis in a unit cycle was obtained. The area B was an area without the decrease. The voltage holding ratio was a percentage of the area A to the area B.

Voltage Holding Ratio (VHR-2; measured at 80° C.; %): A TN device used for measurement had a polyimide-alignment film, and the distance between two glass substrates (cell gap) was 5 μm. A sample was poured into the device, and then the device was sealed with an adhesive curable on irradiation with ultraviolet light. The TN device was impressed and charged with pulse voltage (60 microseconds at 5 V). A decreasing voltage was measured for 16.7 milliseconds with a high-speed voltmeter and the area A between a voltage curve and a horizontal axis in a unit cycle was obtained. The area B was an area without the decease. The voltage holding ratio was a percentage of the area A to the area B.

Voltage Holding Ratio (VHR-3; measured at 25° C.; %): A voltage holding ratio was measured after irradiation with ultraviolet light, evaluating the stability to ultraviolet light. A composition having a large VHR-3 has a high stability to ultraviolet light. A TN device used for measurement had a polyimide-alignment film and the cell gap was 5 μm. A sample was poured into the device, and then the device was irradiated with light for 20 minutes. The light source was an ultra high-pressure mercury lamp USH-500D (produced by Ushio, Inc.), and the distance between the device and the light source was 20 cm. In the measurement of VHR-3, a decreasing voltage was measured for 16.7 milliseconds. The value of VHR-3 is preferably 90% or more, and more preferably 95% or more.

Voltage Holding Ratio (VHR-4; measured at 25° C.; %): A TN device into which a sample was poured was heated in a constant-temperature bath at 80° C. for 500 hours, and then the Voltage holding ratio was measured, evaluating the stability to heat. A composition having a large VHR-4 has a high stability to heat. In the measurement of VHR-4, a decreasing voltage was measured for 16.7 milliseconds.

Response Time (τ; measured at 25° C.; millisecond): Measurement was carried out with an LCD evaluation system Model LCD-5100 made by Otsuka Electronics Co., Ltd. The light source was a halogen lamp. The low-pass filter was set at 5 kHz. A sample was poured into a TN device having a normally white mode, in which the cell gap between two glass substrates was 5.0 µm, and the twist angle was 80 degrees. Rectangular waves (60 Hz, 10 V, 0.5 second) were impressed to the device. The device was simultaneously irradiated with light in the perpendicular direction, and the amount of light passing through the device was measured. The maximum amount of light corresponded to 100% transmittance, and the minimum amount of light corresponded to 0% transmittance. Rise time (τr; millisecond) was the time required for a change from 90% to 10% transmittance. Fall time (τf; millisecond) was the time required for a change from 10% to 90% transmittance. The response time was the sum of the rise time and the fall time thus obtained.

Specific resistance (ρ; measured at 25° C.; Ωcm): A sample of 1.0 milliliters was poured into a vessel equipped with electrodes. DC voltage (10V) was impressed to the vessel, and the DC current was measured after 10 seconds. The specific resistance was calculated according to the following equation. (specific resistance)=[(voltage)×(electric capacity of vessel)]/[(DC current)×(dielectric constant in a vacuum)].

Gas chromatographic analysis: A gas chromatograph Model GC-14B made by Shimadzu Corporation was used for measurement. The carrier gas was helium (2 milliliters per minute). The evaporator and the detector (FID) were set up at 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. A recorder used was a Model C-R5A Chromatopac Integrator made by Shimadzu Corporation or its equivalent. A gas chromatogram obtained showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (50 meters, bore 0.25 millimeter, film thickness 0.25 micrometer) made by Shimadzu Corporation may also be used for the purpose of avoiding an overlap of peaks of the compounds.

The ratio of the liquid crystal compounds included in the composition may be calculated according to the following method. The liquid crystal compounds are detected by use of a gas chromatograph. The ratio of peak areas in the gas chromatogram corresponds to the ratio (in moles) of the liquid crystal compounds. When the capillary columns described above are used, the correction coefficient of respective liquid crystal compounds may be regarded as 1 (one). Accordingly, the ratio (percent by weight) of the liquid crystal compound can be calculated from the ratio of peak areas.

The invention will be explained in detail by way of Examples. The invention is not limited by Examples described below. The compounds described in Comparative Examples and Examples were expressed as symbols according to the definition in the following Table 3. In Table 3, the configuration of 1,4-cyclohexylene is trans. A parenthesized number next to the symbolized compound in Example corresponds to the compound's number. The symbol (-) means other liquid crystal compounds. Ratios (percentage) of liquid crystal compounds mean the percentages by weight (% by weight) based on the total weight of the liquid crystal composition. The liquid crystal composition further includes an impurity. Last, characteristics of the composition are summarized.

TABLE 3

Method of Description of Compound using Symbols
R—(A$_1$)—Z$_1$—...—Z$_n$—(A$_n$)—R'

| 1) Left-terminal Group R— | Symbol |
|---|---|
| $C_nH_{2n+1}$— | n— |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |

| 2) Right-teminal Group —R' | Symbol |
|---|---|
| —$C_nH_{2n+1}$ | —n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —F | —F |
| —Cl | —CL |
| —$OCF_3$ | —OCF3 |
| —CN | —C |

| 3) Bonding Group —Z$_n$— | Symbol |
|---|---|
| —$C_2H_4$— | 2 |
| —COO— | E |
| —CH=CH— | V |
| —C≡C— | T |
| —$CF_2O$— | X |

| 4) Ring Structure —A$_n$— | Symbol |
|---|---|
| cyclohexylene | H |
| phenylene | B |
| fluorophenylene | B(F) |

TABLE 3-continued

Method of Description of Compound using Symbols
R—(A$_1$)—Z$_1$— . . . —Z$_n$—(A$_n$)—R'

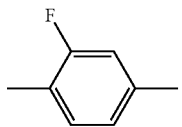 B(2F)

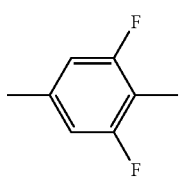 B(F, F)

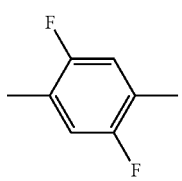 B(2F, 5F)

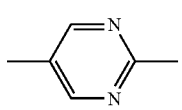 Py

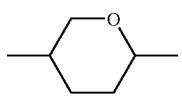 dh

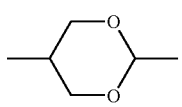 G

5) Example of Description

Example 1. 5-BB(F)B(F,F)XB(F)-OCF3

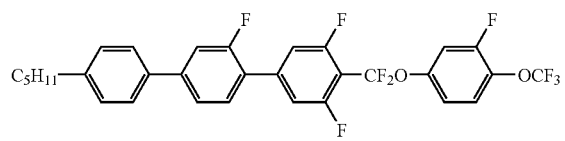

Example 2. V-HH-V

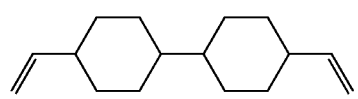

Example 3. 3-HHB-1

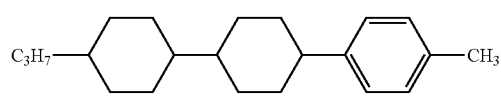

Example 4. 3-BB(F)B(F,F)-F

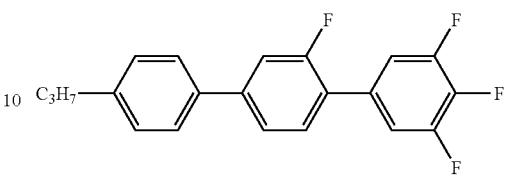

Comparative Example 1

The composition of Example 1 was selected from the compositions disclosed in JP H10-46150 A (1998) for comparison. The basis for the selection was because the composition contained the compound (2-1-1) and the compound (4), and had the smallest viscosity. The composition had the following components and characteristics. Since rotational viscosity was not mentioned in Example 1, it was measured according to the method described above after the preparation of the composition.

| V2-HH-2V | (2-1-1) | 30% |
| V-HHB(F)-F | (4) | 35% |
| V2-HHB(F)-F | (4) | 35% |

NI = 102.0° C.;
Δn = 0.079;
Δε = 3.0;
Vth = 2.46 V;
η = 12.9 mPa · s;
γ1 = 56.4 mPa · s.

Comparative Example 2

The composition of Example 12 was selected from the compositions disclosed in JP 2003-518154 A (2003) for comparison. The basis for the selection was because the composition contained the compound (3-1-1), the compound (3-2-1), the compound (3-5-1), the compound (3-6-1), the compound (3-9-1), the compound (4), the compound (4-10-1), the compound (4-11-1) and the compound (4-15-1), and had the smallest rotational viscosity. The composition had the following components and characteristics.

| V-HH-3 | (3-1-1) | 18% |
| 1V-HH-3 | (3-1-1) | 9% |
| 3-HH-5 | (3-1-1) | 3% |
| V-HH-5 | (3-1-1) | 2% |
| 5-HB-3 | (3-2-1) | 2% |
| 2-HHB-OCF3 | (4) | 2% |
| 3-HHB-OCF3 | (4) | 6% |
| 3-BB(F)B(F,F)-F | (4-10-1) | 7% |
| 2-BB(F,F)XB(F,F)-F | (4-11-1) | 6% |
| 3-BB(F,F)XB(F,F)-F | (4-11-1) | 11% |
| 3-HHEB(F,F)-F | (4-15-1) | 4% |
| 3-HB(F)EB-OCF3 | (4) | 8% |
| V-HHB(F)-F | (4) | 5% |
| V-HHB-1 | (3-5-1) | 13% |

-continued

| | | |
|---|---|---|
| 5-HBBH-3 | (3-9-1) | 2% |
| 3-HBB-2 | (3-6-1) | 2% |

NI = 80.0° C.;

Δn = 0.102;

Vth = 1.57 V;

γ1 = 72.0 mPa · s.

Comparative Example 3

The composition of Example 21 was selected from the compositions disclosed in JP 2007-526931 A (2007) for comparison. The basis for the selection was because the composition contained the compound (2-1-1), the compound (3-1-1), the compound (3-7-1), the compound (4), the compound (4-11-1) and the compound (4-15-1), and had the smallest rotational viscosity. The composition had the following components and characteristics.

| | | |
|---|---|---|
| 2-HHB-OCF3 | (4) | 4% |
| 3-HHB-OCF3 | (4) | 4% |
| 3-HHEB(F,F)-F | (4-15-1) | 4% |
| 1-BB(F,F)XB(F,F)-F | (4-11-1) | 8% |
| 2-BB(F,F)XB(F,F)-F | (4-11-1) | 8% |
| 1V-HH-3 | (3-1-1) | 6% |
| 1V-HVHB-OCF3 | (—) | 14% |
| 2V-HVHB-OCF3 | (—) | 4% |
| 2-BB(F)B-4 | (3-7-1) | 8% |
| V-HH-V1 | (2-1-1) | 40% |

NI = 76.0° C.;

Δε = 5.4;

γ1 = 58.0 mPa · s.

Example 1

| | | |
|---|---|---|
| 3-HBBXB(F,F)-F | (1-1-1) | 4% |
| 5-BB(F,F)XB(F)B(F,F)-F | (1-3-2) | 4% |
| 5-BB(F)B(F)B(F,F)XB(F,F)-F | (1-6-2) | 3% |
| 5-BB(F)B(F,F)XB(F)B(F,F)-F | (1-8-2) | 7% |
| V-HH-V | (2-1-1) | 15% |
| V-HH-2V | (2-1-1) | 20% |
| 1V-HH-V | (2-1-1) | 10% |
| V-HH-3 | (3-1-1) | 9% |
| 3-HB-O2 | (3-2-1) | 6% |
| V2-BB-1 | (3-3-1) | 5% |
| V-HHB-1 | (3-5-1) | 8% |
| 1-BB(F)B-2V | (3-7-1) | 5% |
| 2-BB(F)B-2V | (3-7-1) | 4% |

NI = 78.4° C.;

Tc ≦ −20° C.;

Δn = 0.110;

Δε = 3.1;

Vth = 2.50 V;

η = 10.9 mPa · s;

γ1 = 44.6 mPa · s;

τ = 8.5 ms;

VHR-1 = 99.1%;

VHR-2 = 98.0%;

VHR-3 = 98.1%.

Example 2

| | | |
|---|---|---|
| 3-HBB(F,F)XB(F,F)-F | (1-1-2) | 7% |
| 3-HB(F)B(F,F)XB(F,F)-F | (1-1-3) | 7% |
| V-HH-2V | (2-1-1) | 20% |
| V2-HH-2V | (2-1-1) | 10% |
| 1V2-HH-V | (2-1-1) | 5% |
| V-HH-3 | (3-1-1) | 15% |
| V-HH-5 | (3-1-1) | 6% |
| V2-HHB-1 | (3-5-1) | 6% |
| 1V-HBB-2 | (3-6-1) | 3% |
| 3-BB(F)B-2V | (3-7-1) | 5% |
| 3-HHEBH-5 | (3-8-1) | 3% |
| 3-HHB(F,F)-F | (4-5-1) | 3% |
| 3-BB(F,F)XB(F,F)-F | (4-11-1) | 10% |

NI = 75.1° C.;

Tc ≦ −20° C.;

Δn = 0.091;

Δε = 3.2;

Vth = 2.38 V;

η = 11.8 mPa · s;

γ1 = 46.8 mPa · s;

τ = 8.7 ms;

VHR-1 = 99.1%;

VHR-2 = 98.0%;

VHR-3 = 98.2%.

Example 3

| | | |
|---|---|---|
| 5-BBB(F,F)XB(F,F)-F | (1-2-1) | 3% |
| 4-BB(F)B(F,F)XB(F,F)-F | (1-2-3) | 9% |
| 5-HHBB(F,F)XB(F,F)-F | (1-4-1) | 3% |
| 5-PyB(F)B(F,F)XB(F)B(F,F)-F | (1-9-1) | 4% |
| V-HH-V | (2-1-1) | 15% |
| V-HH-2V | (2-1-1) | 20% |
| 1V-HH-V | (2-1-1) | 10% |
| 2-HH-3 | (3-1-1) | 12% |
| 1V-HH-3 | (3-1-1) | 8% |
| 2-BB(F)B-3 | (3-7-1) | 5% |
| 1V2-BB-CL | (4-3-1) | 4% |
| 5-HBB-F | (4-7-1) | 3% |
| 2-HBB(F,F)-F | (4-8-1) | 4% |

NI = 71.3° C.;

Tc ≦ −20° C.;

Δn = 0.098;

Δε = 3.1;

Vth = 2.45 V;

η = 11.7 mPa · s;

γ1 = 46.6 mPa · s;

τ = 8.7 ms;

VHR-1 = 99.0%;

VHR-2 = 98.0%;

VHR-3 = 97.8%.

Example 4

| | | |
|---|---|---|
| 5-HBB(F,F)XB(F)B(F,F)-F | (1-7-1) | 3% |
| 5-HB(F)B(F,F)XB(F)B(F,F)-F | (1-7-2) | 3% |
| V-HH-2V | (2-1-1) | 20% |
| V2-HH-2V | (2-1-1) | 7% |
| 1V2-HH-2V1 | (2-1-1) | 4% |
| V-HH-3 | (3-1-1) | 23% |
| 3-HH-4 | (3-1-1) | 4% |
| VFF-HHB-1 | (3-5) | 3% |
| 3-HHB-O1 | (3-5-1) | 3% |
| V2-HHB-1 | (3-5-1) | 6% |
| 1-BB(F)B-2V | (3-7-1) | 4% |
| 3-HHXB(F,F)-F | (4-6-1) | 3% |

| -continued | | |
|---|---|---|
| 3-BB(F)B(F,F)-F | (4-10-1) | 5% |
| 3-BB(F,F)XB(F,F)-F | (4-11-1) | 12% |

NI = 70.2° C.;
Tc ≦ −20° C.;
Δn = 0.090;
Δε = 2.8;
Vth = 2.59 V;
η = 11.0 mPa · s;
γ1 = 45.0 mPa · s;
τ = 8.5 ms;
VHR-1 = 99.0%;
VHR-2 = 98.1%;
VHR-3 = 98.1%.

Example 5

| | | |
|---|---|---|
| 3-BB(F)B(F,F)XB(F)-OCF3 | (1-2-2) | 3% |
| 4-BB(F)B(F,F)XB(F,F)-F | (1-2-3) | 8% |
| 3-BB(F,F)XB(F,F)B(F)-OCF3 | (1-3-1) | 3% |
| 5-BB(F)B(F,F)XB(F)B(F)-OCF3 | (1-8-1) | 4% |
| V-HH-V | (2-1-1) | 15% |
| V-HH-2V | (2-1-1) | 20% |
| 1V-HH-V1 | (2-1-1) | 5% |
| 1V2-HH-V | (2-1-1) | 5% |
| 3-HH-5 | (3-1-1) | 3% |
| V-HH-3 | (3-1-1) | 7% |
| 7-HB-1 | (3-2-1) | 4% |
| 1V2-BB-1 | (3-3-1) | 4% |
| V2-HHB-1 | (3-5-1) | 8% |
| 3-HBB-2 | (3-6-1) | 3% |
| 5-HB(F)BH-3 | (3-10-1) | 3% |
| 3-BB(F,F)XB(F)-OCF3 | (4-12-1) | 5% |

NI = 75.3° C.;
Tc ≦ −20° C.;
Δn = 0.098;
Δε = 2.7;
Vth = 2.64 V;
η = 11.9 mPa · s;
γ1 = 47.7 mPa · s;
τ = 8.9 ms;
VHR-1 = 99.1%;
VHR-2 = 98.0%;
VHR-3 = 98.1%

Example 6

| | | |
|---|---|---|
| 4-BB(F)B(F,F)XB(F,F)-F | (1-2-3) | 9% |
| 5-HHB(F)B(F,F)XB(F,F)-F | (1-4-2) | 3% |
| 5-HBBB(F,F)XB(F,F)-F | (1-5-1) | 3% |
| V-HH-V | (2-1-1) | 10% |
| V-HH-2V | (2-1-1) | 20% |
| 3-HH-VFF | (3-1) | 5% |
| V-HH-3 | (3-1-1) | 24% |
| V2-HHB-1 | (3-5-1) | 3% |
| 2-BB(F)B-2V | (3-7-1) | 5% |
| 5-HBBH-3 | (3-9-1) | 3% |
| 3-HB-CL | (4-1-1) | 4% |
| 3-HB(F)B(F,F)-F | (4-9-1) | 4% |
| 3-BB(F,F)XB(F,F)-F | (4-11-1) | 7% |

NI = 71.2° C.;
Tc ≦ −20° C.;
Δn = 0.094;
Δε = 3.2;
Vth = 2.36 V;
η = 11.8 mPa · s;
γ1 = 47.4 mPa · s;
τ = 8.8 ms;
VHR-1 = 99.0%;
VHR-2 = 98.1%;
VHR-3 = 98.2%.

Example 7

| | | |
|---|---|---|
| 4-BB(F)B(F,F)XB(F,F)-F | (1-2-3) | 5% |
| 5-HBB(F)B(F,F)XB(F,F)-F | (1-5-2) | 3% |
| 5-BB(F)B(F,F)XB(F)B(F,F)-F | (1-8-2) | 4% |
| V-HH-V | (2-1-1) | 15% |
| V-HH-2V | (2-1-1) | 20% |
| 1V-HH-V | (2-1-1) | 10% |
| V-HH-3 | (3-1-1) | 12% |
| 1V-HH-3 | (3-1-1) | 8% |
| V-HHB-1 | (3-5-1) | 5% |
| 5-HBB(F)B-3 | (3-11-1) | 4% |
| 3-BB(F,F)XB(F,F)-F | (4-11-1) | 7% |
| 3-HHXB(F)-OCF3 | (4-13-1) | 3% |
| 3-BB(F,F)XB(F)-F | (4-14-1) | 4% |

NI = 72.0° C.;
Tc ≦ −20° C.;
Δn = 0.087;
Δε = 2.8;
Vth = 2.58 V;
η = 11.5 mPa · s;
γ1 = 46.3 mPa · s;
τ = 8.7 ms;
VHR-1 = 99.1%;
VHR-2 = 98.0%;
VHR-3 = 97.9%.

Example 8

| | | |
|---|---|---|
| 5-HB(F)B(F)B(F,F)XB(F,F)-F | (1-5-3) | 3% |
| 5-BB(F)B(F)B(F,F)XB(F)-F | (1-6-1) | 4% |
| V-HH-V | (2-1-1) | 15% |
| V-HH-2V | (2-1-1) | 15% |
| 1V-HH-V | (2-1-1) | 8% |
| 1V-HH-V1 | (2-1-1) | 5% |
| 1V2-HH-V | (2-1-1) | 5% |
| 1V2-HH-2V1 | (2-1-1) | 4% |
| 3-HH-O1 | (3-1-1) | 3% |
| 3-HHEH-5 | (3-4-1) | 3% |
| 3-HHB-1 | (3-5-1) | 4% |
| 1-BB(F)B-2V | (3-7-1) | 5% |
| 2-BB(F)B-2V | (3-7-1) | 5% |
| 1V2-BB-F | (4-2-1) | 3% |
| 3-HHB-CL | (4-4-1) | 3% |
| 3-BB(F,F)XB(F,F)-F | (4-11-1) | 15% |

NI = 70.9° C.;
Tc ≦ −20° C.;
Δn = 0.099;
Δε = 2.9;
Vth = 2.46 V;
η = 11.3 mPa · s;
γ1 = 45.4 mPa · s;
τ = 8.6 ms;
VHR-1 = 99.0%;
VHR-2 = 97.9%;
VHR-3 = 98.0%.

Example 9

| | | |
|---|---|---|
| 3-BB(F)B(F,F)XB(F,F)-F | (1-2-3) | 3% |
| 4-BB(F)B(F,F)XB(F,F)-F | (1-2-3) | 7% |
| V-HH-V | (2-1-1) | 10% |
| V-HH-2V | (2-1-1) | 20% |
| 1V-HH-V | (2-1-1) | 10% |
| V-HH-3 | (3-1-1) | 15% |
| V2-BB-1 | (3-3-1) | 4% |
| 1-BB(F)B-2V | (3-7-1) | 7% |
| 2-BB(F)B-2V | (3-7-1) | 8% |
| 3-BB(F,F)XB(F,F)-F | (4-11-1) | 4% |

-continued

| | | |
|---|---|---|
| 3-HHEB(F,F)-F | (4-15-1) | 3% |
| 3-HBEB(F,F)-F | (4-16-1) | 3% |
| 1O1-HBBH-5 | (—) | 3% |
| 3-HHB(F)B(F,F)-F | (—) | 3% |

NI = 74.3° C.;
Tc ≦ −20° C.;
Δn = 0.111;
Δε = 3.0;
Vth = 2.39 V;
η = 11.0 mPa · s;
γ1 = 44.5 mPa · s;
τ = 8.5 ms;
VHR-1 = 99.2%;
VHR-2 = 98.0%;
VHR-3 = 98.1%.

Example 10

| | | |
|---|---|---|
| 3-BB(F)B(F,F)XB(F,F)-F | (1-2-3) | 3% |
| 4-BB(F)B(F,F)XB(F,F)-F | (1-2-3) | 10% |
| V-HH-V | (2-1-1) | 10% |
| V-HH-2V | (2-1-1) | 20% |
| 1V-HH-V | (2-1-1) | 10% |
| V-HH-3 | (3-1-1) | 18% |
| V2-BB-1 | (3-3-1) | 4% |
| 1-BB(F)B-2V | (3-7-1) | 7% |
| 2-BB(F)B-2V | (3-7-1) | 8% |
| 3-HGB(F,F)-F | (4-17-1) | 3% |
| 5-GHB(F,F)-F | (4-18-1) | 4% |
| 3-HHBB(F,F)-F | (—) | 3% |

NI = 73.8° C.;
Tc ≦ −20° C.;
Δn = 0.109;
Δε = 3.0;
Vth = 2.37 V;
η = 10.3 mPa · s;
γ1 = 42.9 mPa · s;
τ = 8.4 ms;
VHR-1 = 99.0%;
VHR-2 = 97.9%;
VHR-3 = 97.9%.

The compositions in Examples 1 to 10 had a small rotational viscosity in comparison with those in Comparative Examples 1 to 3. Thus, the liquid crystal composition of the invention was so much superior in characteristics to that described in the patent documents Nos. 1 to 5.

The invention provides a liquid crystal composition that satisfies at least one characteristic among characteristics such as a high maximum temperature of a nematic phase, a low minimum temperature of a nematic phase, a small viscosity, a large optical anisotropy, a large dielectric anisotropy, a large specific resistance, a high stability to ultraviolet light and a high stability to heat, or that is suitably balanced regarding at least two of the characteristics. Since a liquid crystal display device that contains the composition provides a AM device having a short response time, a large voltage holding ratio, a large contrast ratio, a long service life and so forth, it cab be used for a liquid crystal projector, a liquid crystal television and so forth.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a nematic phase that comprises two components, wherein the first component is at least one compound selected from the group of compounds represented by formulas (1-1), (1-3), (1-4), (1-5), (1-6), (1-7), (1-8) and (1-9), the second, component is at least one compound selected from the group of compounds represented by formula (2):

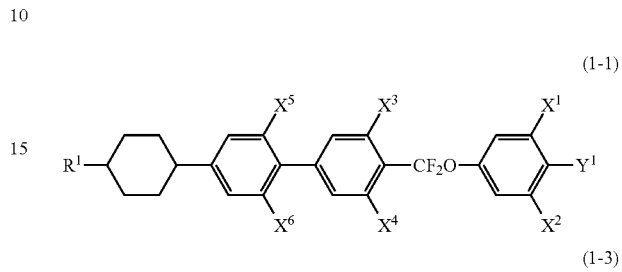

(1-1)

(1-3)

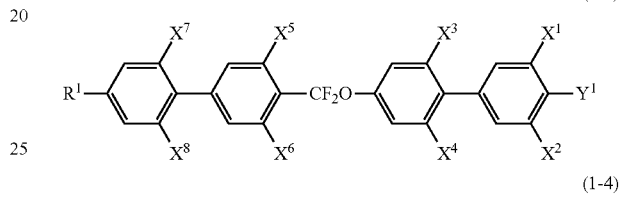

(1-4)

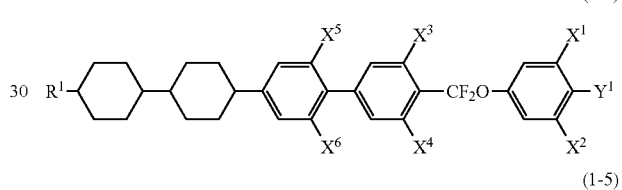

(1-5)

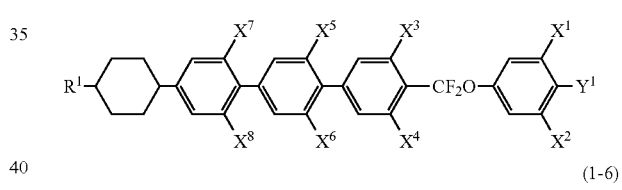

(1-6)

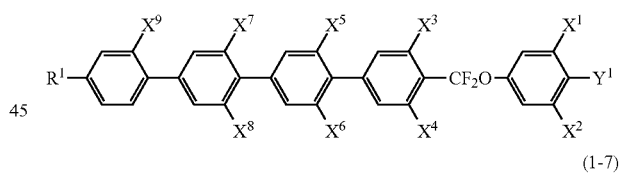

(1-7)

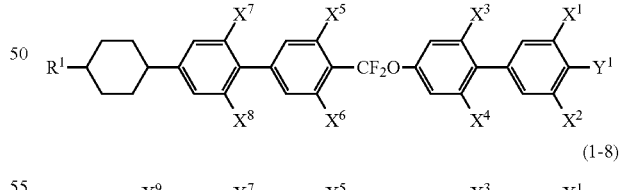

(1-8)

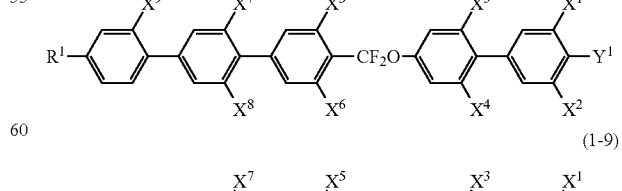

(1-9)

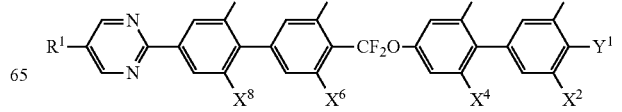

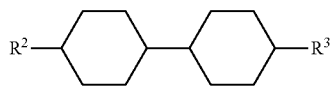 (2)

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^2$ and $R^3$ are each independently alkenyl having 2 to 12 carbons; $X^1, X^2, X^3, X^4, X^5, X^6, X^7, X^8$ and $X^9$ are each independently hydrogen or fluorine; $Y^1$ is fluorine, chlorine or trifluoromethoxy.

2. The liquid crystal composition according to claim 1, wherein the first component is at least one compound selected from the group of compounds represented by formula (1-1).

3. The liquid crystal composition according claim 1, wherein the ratio of the first component is in the range of approximately 5% to approximately 40% by weight and the ratio of the second component is in the range of approximately 20% to approximately 95% by weight, based on the total weight of the liquid crystal composition.

4. The liquid crystal composition according to claim 1, wherein the composition further comprises at least one compound selected from the group of compounds represented by formula (3) as a third component:

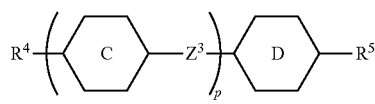 (3)

wherein $R^4$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^5$ is alkyl having 1 to 12 carbons or alkoxy having 1 to 12 carbons; ring C and ring D are each independently 1,4-cyclohexylene, 1,4-phenylene, 2-fluoro-1,4-phenylene, 3-fluoro-1,4-phenylene or 2,5-difluoro-1,4-phenylene; $Z^3$ is independently a single bond, ethylene or carbonyloxy; and p is 1, 2 or 3.

5. The liquid crystal composition according to claim 4, wherein the third component is at least one compound selected from the group of compounds represented by formulas (3-1) to (3-11):

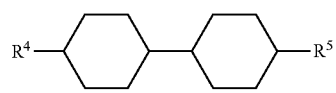 (3-1)

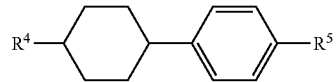 (3-2)

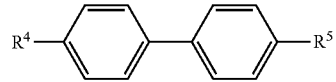 (3-3)

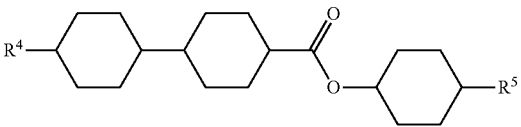 (3-4)

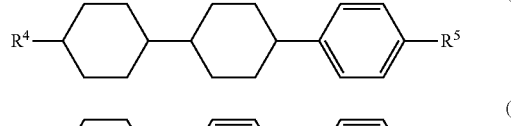 (3-5)

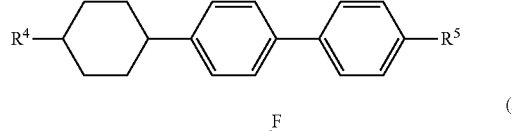 (3-6)

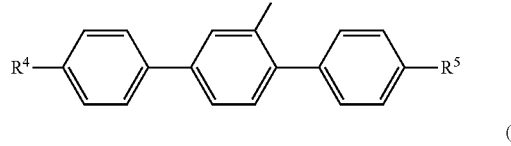 (3-7)

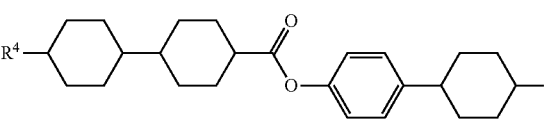 (3-8)

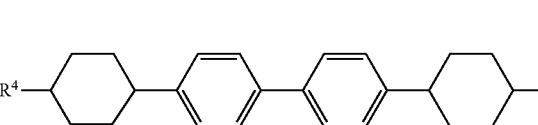 (3-9)

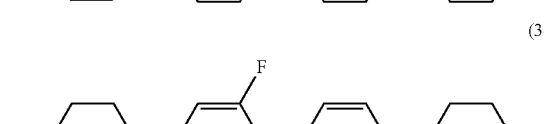 (3-10)

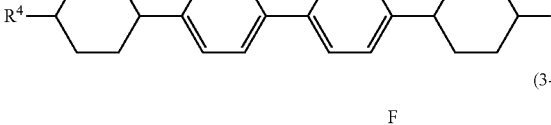 (3-11)

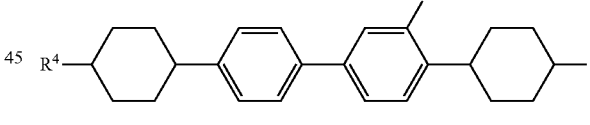

wherein $R^4$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; and $R^5$ is alkyl having 1 to 12 carbons or alkoxy having 1 to 12 carbons.

6. The liquid crystal composition according to claim 5, wherein the third component is at least one compound selected from the group of compounds represented by formula (3-1).

7. The liquid crystal composition according to claim 4, wherein the ratio of the third component is in the range of approximately 5% to approximately 60% by weight based on the total weight of the liquid crystal composition.

8. The liquid crystal composition according to claim 1, wherein the composition further comprises at least one compound selected from the group of compounds represented by formula (4) as a fourth component:

(4)

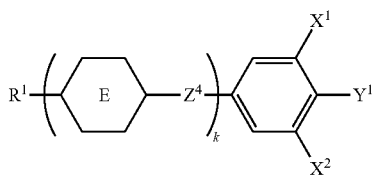

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring E is independently 1,4-cyclohexylene, 1,3-dioxane-2,5-diyl, 1,4-phenylene 2-fluoro-1,4-phenylene, 3-fluoro-1,4-phenylene, 3,5-difluoro-1,4-phenylene or pyrimidine-2,5-diyl; $Z^4$ is independently a single bond, ethylene, carbonyloxy or difluoromethyleneoxy; $X^1$ and $X^2$ are each independently hydrogen or fluorine; $Y^1$ is fluorine, chlorine or trifluoromethoxy; and k is 1 or 2.

9. The liquid crystal composition according to claim 4, wherein the composition further comprises at least one compound selected from the group of compounds represented by formula (4) as a fourth component:

(4)

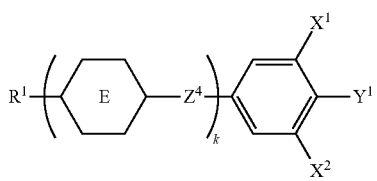

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring E is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene or pyrimidine-2,5-diyl; $Z^4$ is independently a single bond, ethylene, carbonyloxy or difluoromethyleneoxy; $X^1$ and $X^2$ are each independently hydrogen or fluorine; $Y^1$ is fluorine, chlorine or trifluoromethoxy; and k is 1 or 2.

10. The liquid crystal composition according to claim 8, wherein the fourth component is at least one compound selected from the group of compounds represented by formulas (4-1) to (4-18):

(4-1)

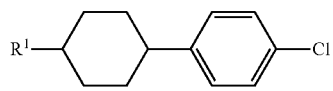

(4-2)

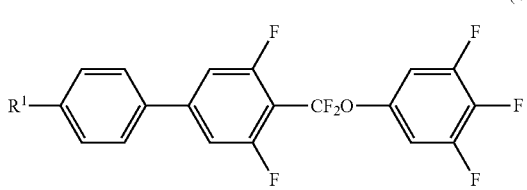

(4-3)

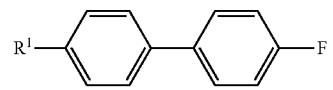

(4-4)

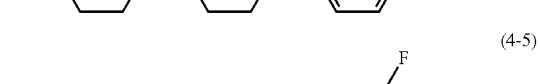

(4-5)

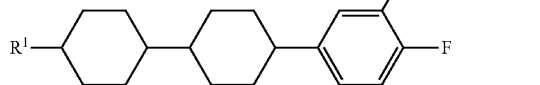

(4-6)

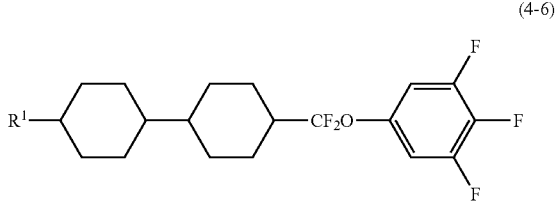

(4-7)

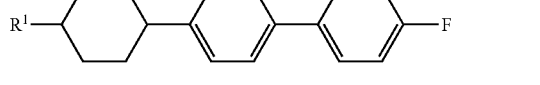

(4-8)

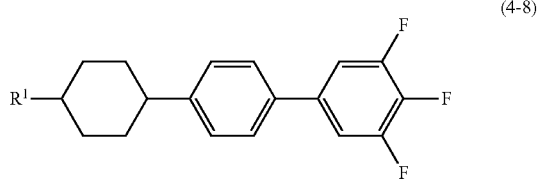

(4-9)

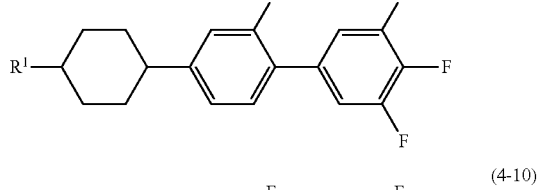

(4-10)

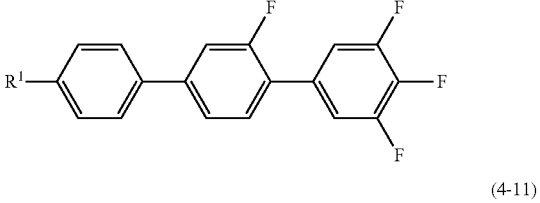

(4-11)

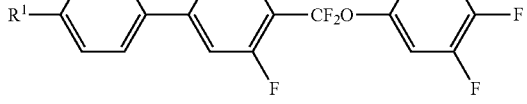

(4-12)

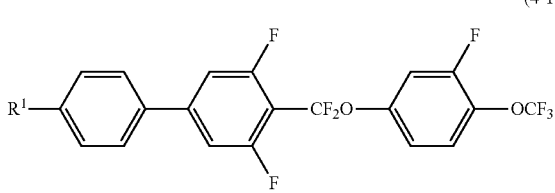

-continued
(4-13)
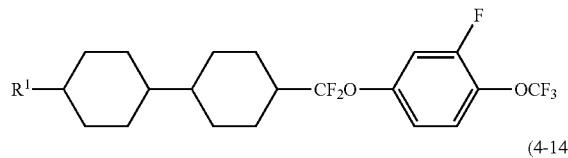
(4-14)
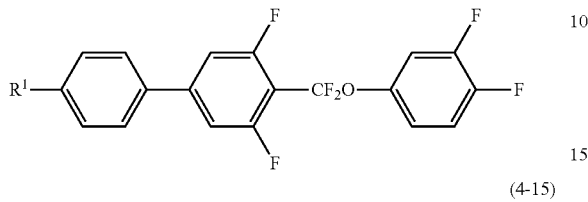
(4-15)
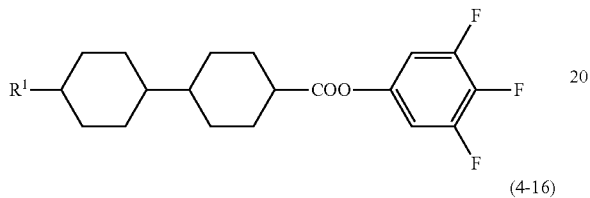
(4-16)
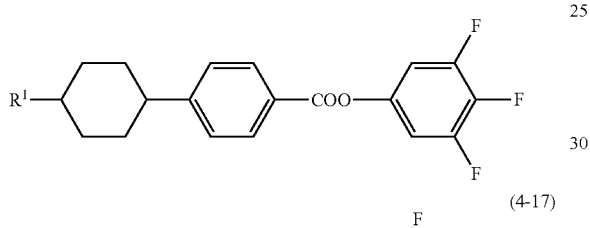
(4-17)
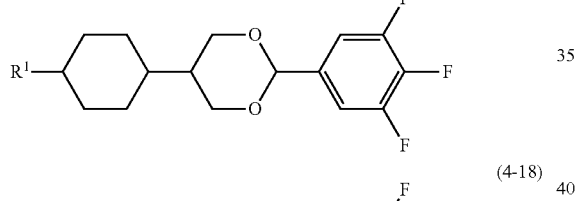
(4-18)
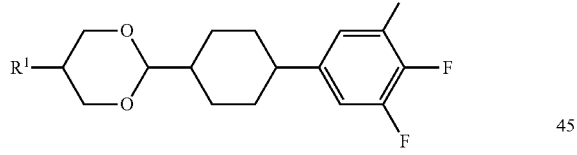
wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.
11. The liquid crystal composition according to claim 9, wherein the fourth component is at least one compound selected from the group of compounds represented by formulas (4-1) to (4-18):
(4-1)
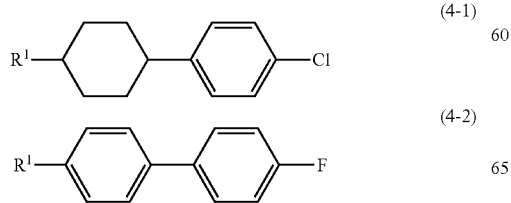
(4-2)
(4-3)
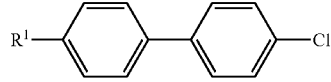
(4-4)
(4-5)
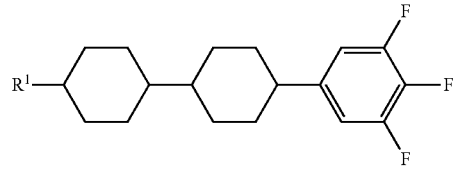
(4-6)
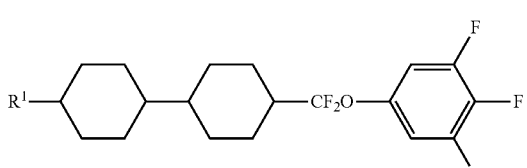
(4-7)
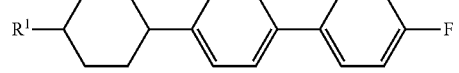
(4-8)
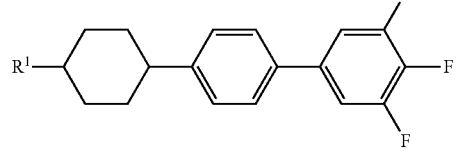
(4-9)
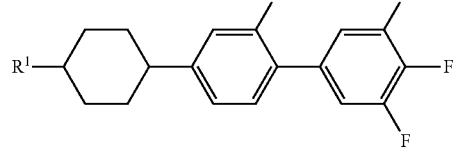
(4-10)
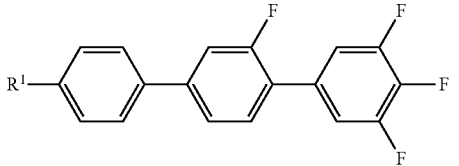
(4-11)
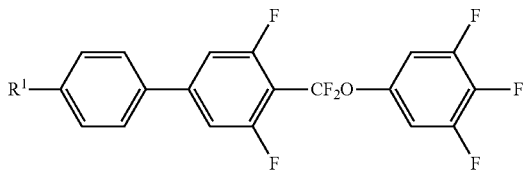

(4-12) 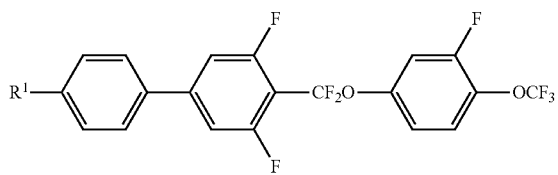

(4-13) 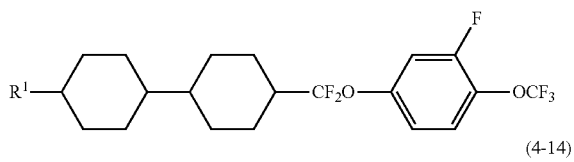

(4-14) 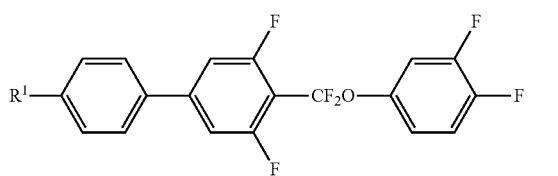

(4-15) 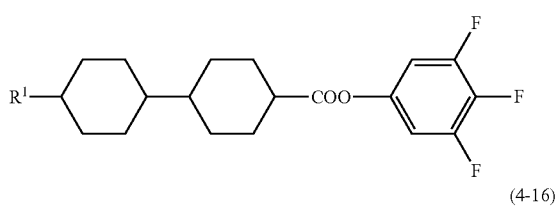

(4-16) 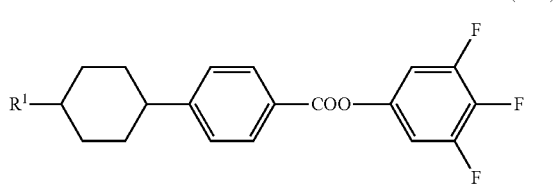

(4-17) 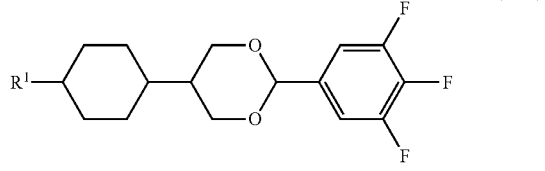

(4-18) 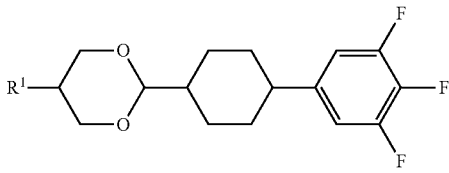

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

12. The liquid crystal composition according to claim 10, wherein the fourth component is at least one compound selected from the group of compounds represented by formula (4-11).

13. The liquid crystal composition according to claim 11, wherein the fourth component is at least one compound selected from the group of compounds represented by formula (4-11).

14. The liquid crystal composition according to claim 8, wherein the ratio of the fourth component is in the range of approximately 5% to approximately 40% by weight based on the total weight of the liquid crystal composition.

15. The liquid crystal composition according to claim 9, wherein the ratio of the fourth component is in the range of approximately 5% to approximately 40% by weight based on the total weight of the liquid crystal composition.

16. The liquid crystal composition according to claim 1, wherein the maximum temperature of a nematic phase is approximately 70° C. or higher, the optical anisotropy (25° C.) at a wavelength of 589 nm is approximately 0.08 or more, and the dielectric anisotropy (25° C.) at a frequency of 1 kHz is approximately 2 or more.

17. A liquid crystal display device comprising the liquid crystal composition according to claim 1.

18. The liquid crystal display device according to claim 17, wherein an operating mode of the liquid crystal display device is a TN mode, an OCB mode, an IPS mode or a PSA mode, and a driving mode of the liquid crystal display device is an active matrix mode.

* * * * *